(12) United States Patent
Jeong

(10) Patent No.: US 10,480,870 B2
(45) Date of Patent: Nov. 19, 2019

(54) HEAT EXCHANGER

(71) Applicant: KYUNGDONG NAVIEN CO., LTD., Pyeongtaek-si, Gyeonggi-do (KR)

(72) Inventor: Inchul Jeong, Seoul (KR)

(73) Assignee: KYUNGDONG NAVIEN CO., LTD., Seoul (KR)

( * ) Notice: Subject to any disclaimer, the term of this patent is extended or adjusted under 35 U.S.C. 154(b) by 164 days.

(21) Appl. No.: 15/752,122

(22) PCT Filed: Aug. 11, 2016

(86) PCT No.: PCT/KR2016/008846
§ 371 (c)(1),
(2) Date: Feb. 12, 2018

(87) PCT Pub. No.: WO2017/039174
PCT Pub. Date: Mar. 9, 2017

(65) Prior Publication Data
US 2018/0238639 A1    Aug. 23, 2018

(30) Foreign Application Priority Data

Aug. 28, 2015  (KR) .......................... 10-2015-0121960

(51) Int. Cl.
*F28F 3/04*    (2006.01)
*F24D 3/08*   (2006.01)
(Continued)

(52) U.S. Cl.
CPC ................ *F28F 3/046* (2013.01); *F24D 3/08* (2013.01); *F24H 1/30* (2013.01); *F24H 1/32* (2013.01);
(Continued)

(58) Field of Classification Search
CPC . F24D 3/08; F28D 9/00; F28D 9/0031; F28D 9/0043; F28D 9/0093;
(Continued)

(56) References Cited

U.S. PATENT DOCUMENTS 9,945,566 B2 *  4/2018  Park ....................... F24H 1/523
2011/0303400 A1  12/2011  Scearce ..................... 165/164

FOREIGN PATENT DOCUMENTS

JP    2006-214628 A    8/2006
KR    10-0424854 B1    3/2004
(Continued)

*Primary Examiner* — Marc E Norman
(74) *Attorney, Agent, or Firm* — Stein IP, LLC

(57) ABSTRACT

A heat exchanger according to the present invention comprises a heat exchange portion in which heating water flow paths where heating water flows through a space between a plurality of plates, hot water flow paths through which hot water flows, and combustion gas flow paths are adjacently and alternatingly formed, wherein the heat exchange portion comprises: a heating sensible heat portion, which surrounds the outside of a combustion chamber and comprises an area on one side of the plates, for heating the heating water using the sensible heat of the combustion gas generated by combustion of the burner; a heating latent heat portion, which comprises a partial area on the other side of the plates, for heating the heating water using the latent heat of water vapors in the combustion gas which has completed heat exchanging in the heating sensible heat portion; and a hot water latent heat portion, which comprises the remaining area on the other side of the plates, for heating direct water using the latent heat of water vapors in the combustion gas which has passed through the heating latent heat portion.

17 Claims, 20 Drawing Sheets

(51) Int. Cl.
    *F24H 1/34*     (2006.01)
    *F28D 9/00*     (2006.01)
    *F24H 9/14*     (2006.01)
    *F28D 20/02*     (2006.01)
    *F28D 21/00*     (2006.01)
    *F24H 1/30*     (2006.01)
    *F24H 1/32*     (2006.01)
    *F24H 1/44*     (2006.01)
    *F24H 8/00*     (2006.01)
    *F28F 3/08*     (2006.01)
    *F24H 9/00*     (2006.01)

(52) U.S. Cl.
    CPC ................. *F24H 1/34* (2013.01); *F24H 1/44* (2013.01); *F24H 1/445* (2013.01); *F24H 8/00* (2013.01); *F24H 9/146* (2013.01); *F28D 9/00* (2013.01); *F28D 9/0031* (2013.01); *F28D 9/0043* (2013.01); *F28D 9/0093* (2013.01); *F28D 20/026* (2013.01); *F28D 21/0007* (2013.01); *F28D 21/0014* (2013.01); *F28F 3/086* (2013.01); *F24H 9/0015* (2013.01)

(58) Field of Classification Search
    CPC ............... F28D 20/026; F28D 21/0007; F28D 21/0014; F24H 1/30; F24H 1/32; F24H 1/34; F24H 1/44; F24H 1/445; F24H 8/00; F24H 9/0015; F24H 9/146; F28F 3/046; F28F 3/086
    See application file for complete search history.

(56) References Cited

FOREIGN PATENT DOCUMENTS

| | | |
|---|---|---|
| KR | 10-2010-0087620 A | 2/2010 |
| KR | 10-2011-0083195 A | 7/2011 |
| KR | 10-2012-0045249 A | 5/2012 |
| KR | 10-2013-0052912 A | 5/2013 |
| WO | WO 2008/107760 A2 | 9/2008 |
| WO | WO 2015/142003 A1 | 9/2015 |

* cited by examiner

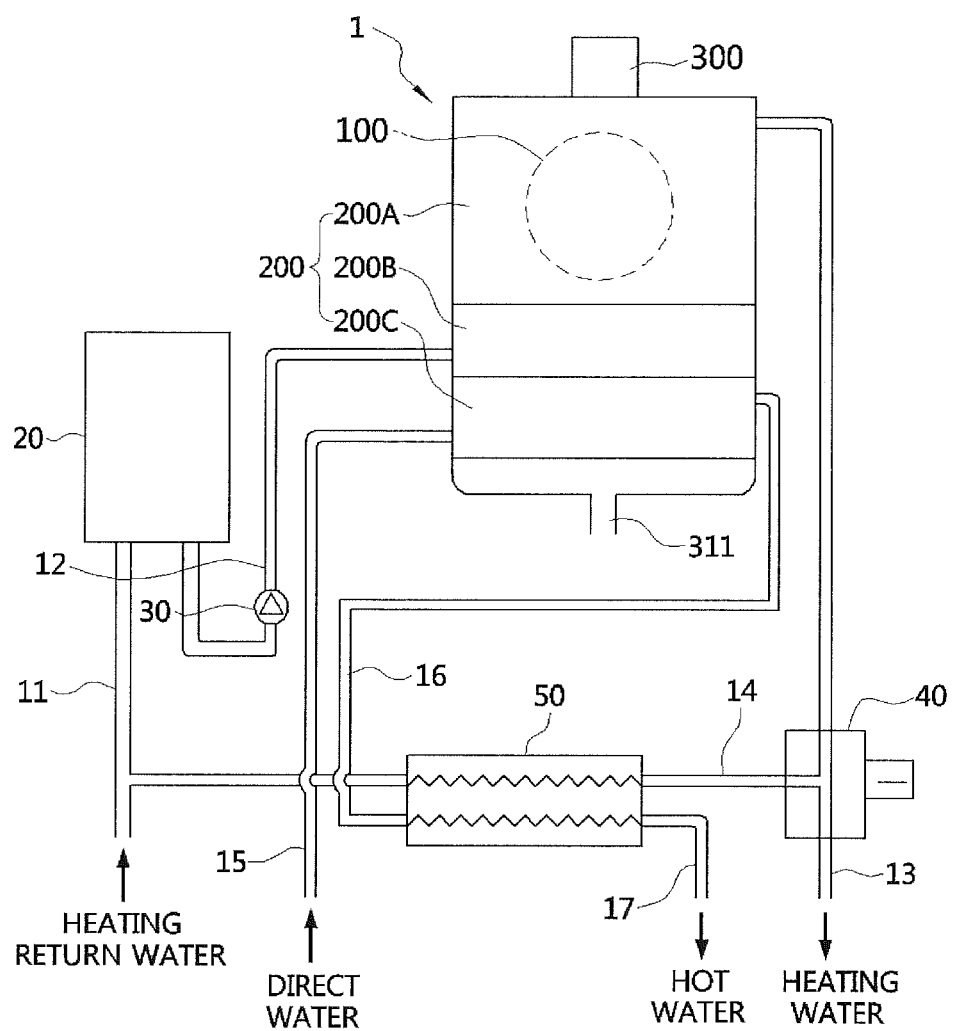
[FIG. 1]

[FIG. 2]
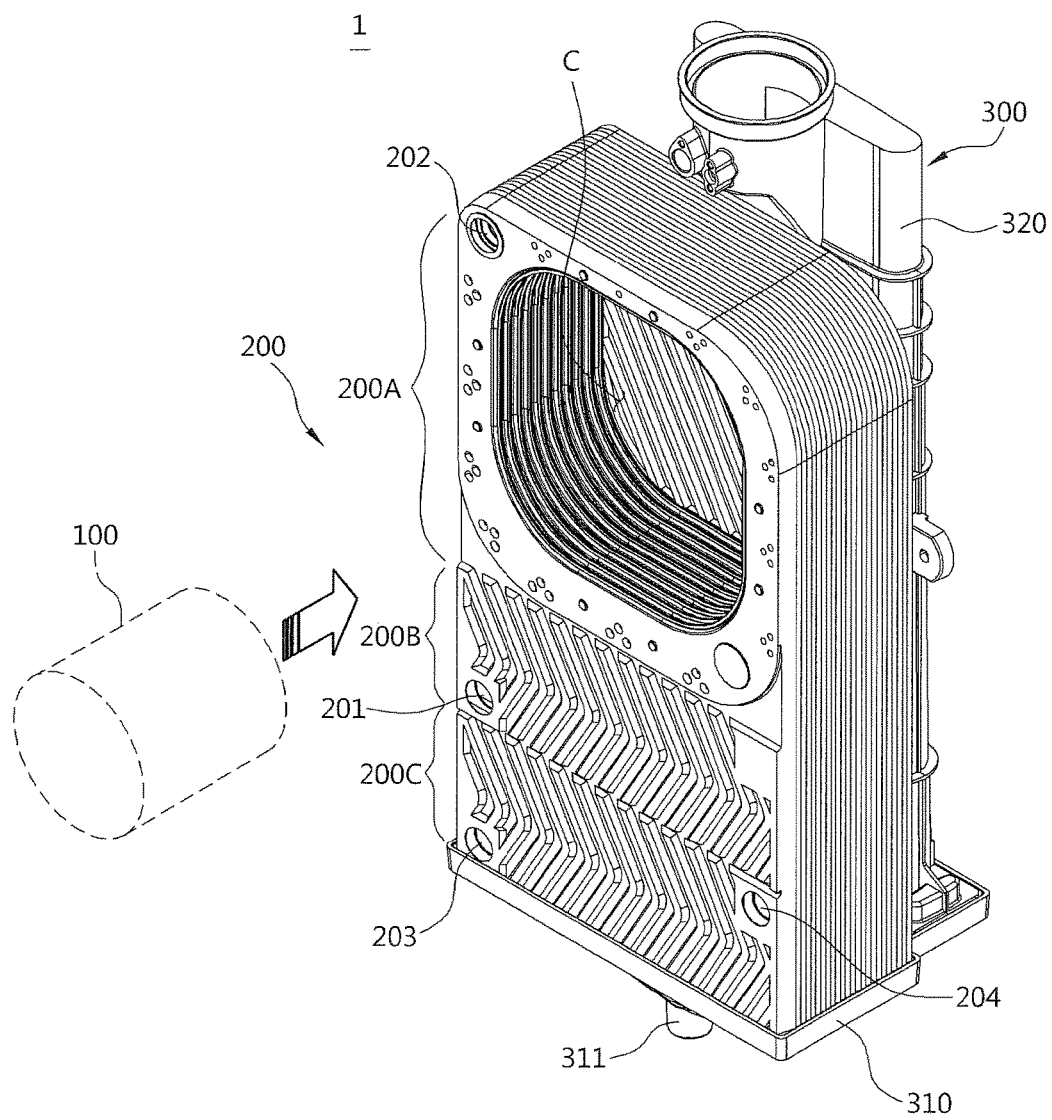

[FIG. 3]
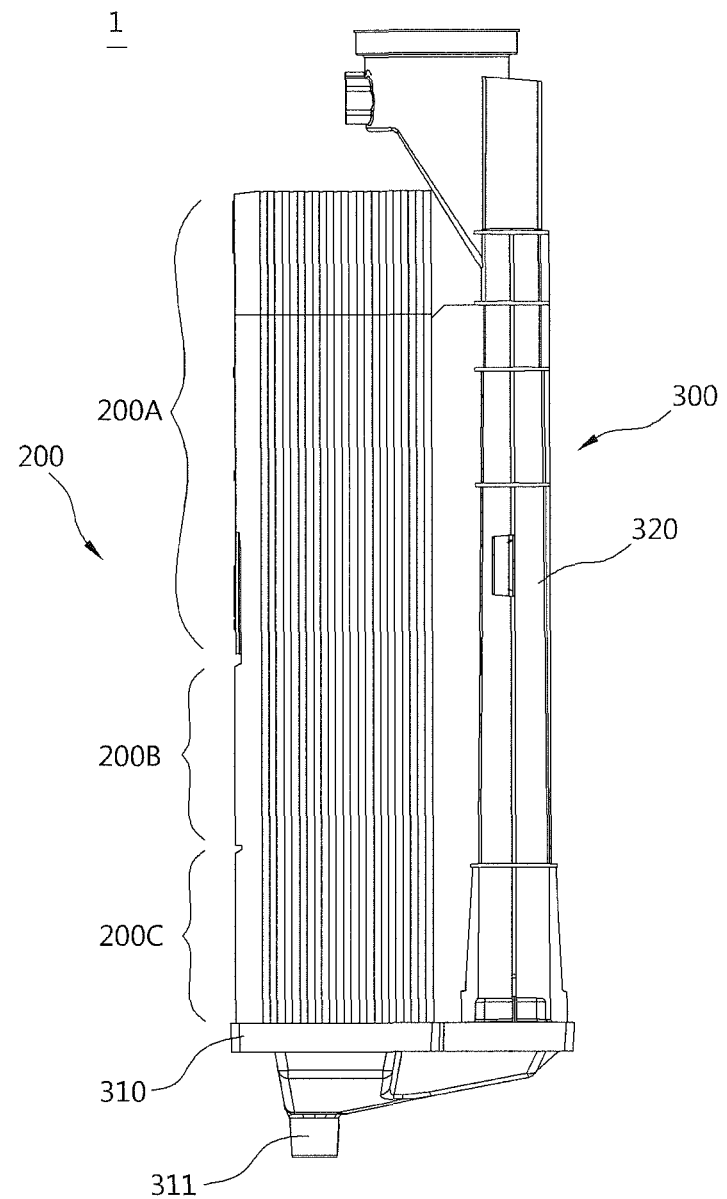

[FIG. 4]
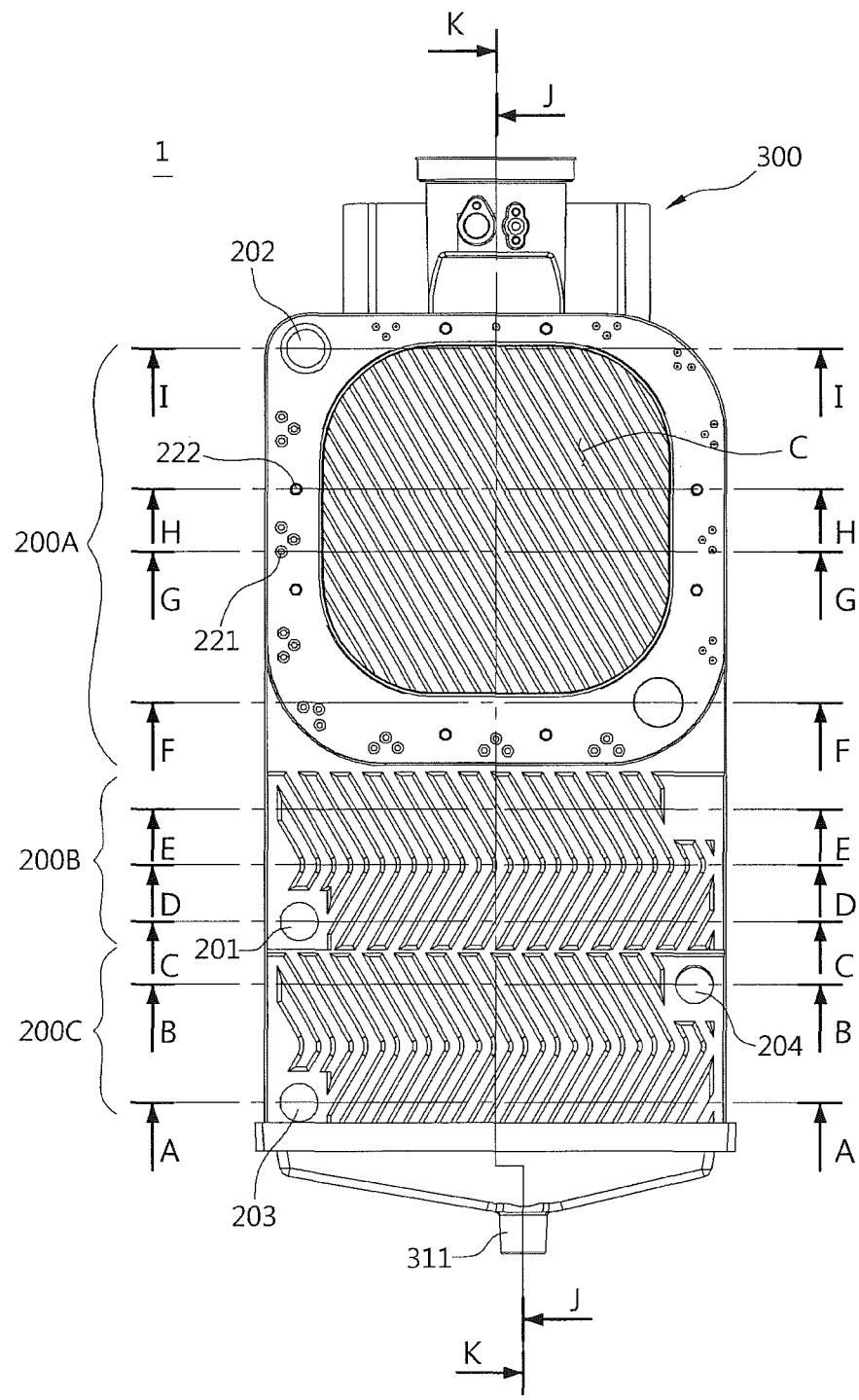

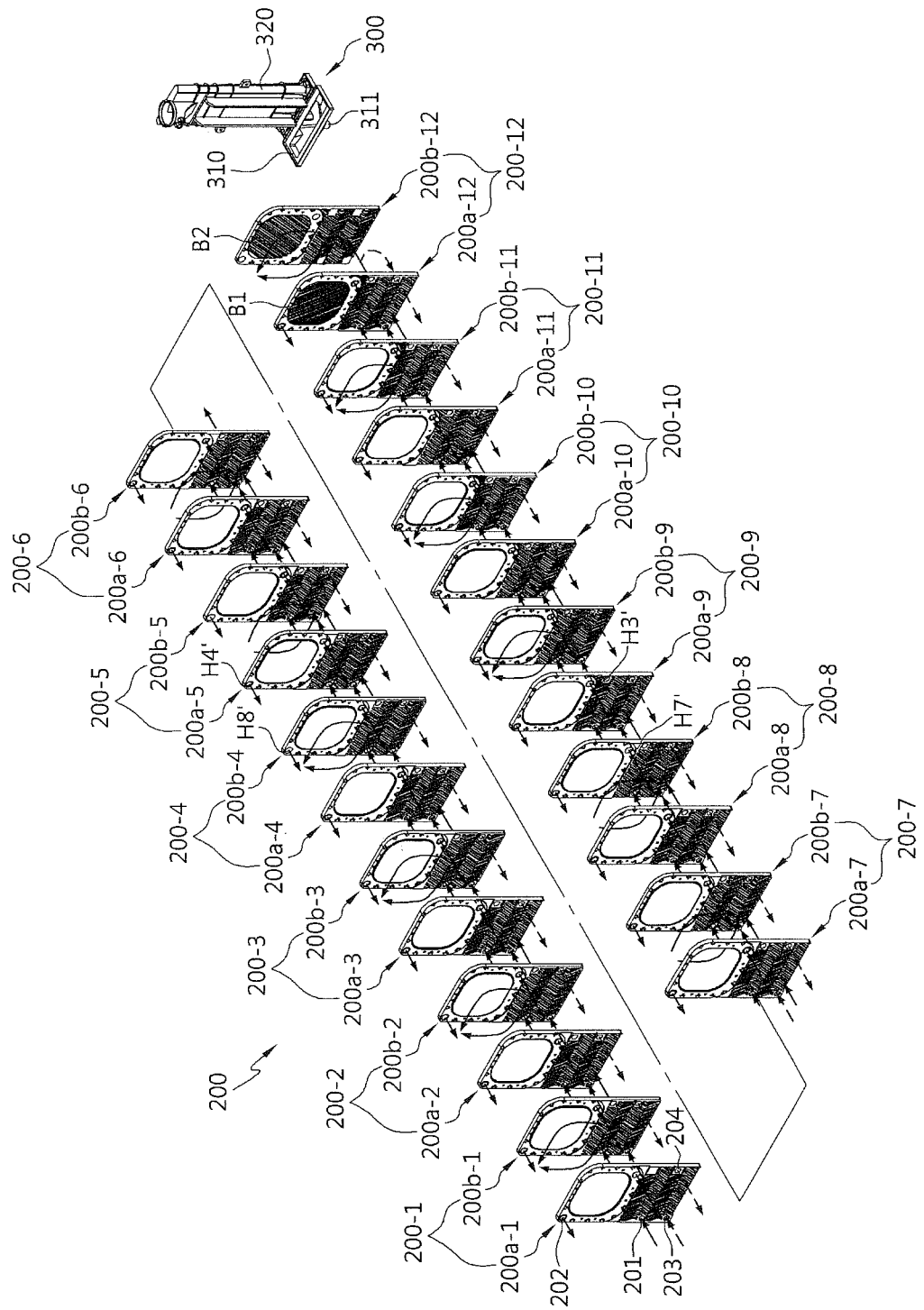
[FIG. 5]

[FIG. 6]
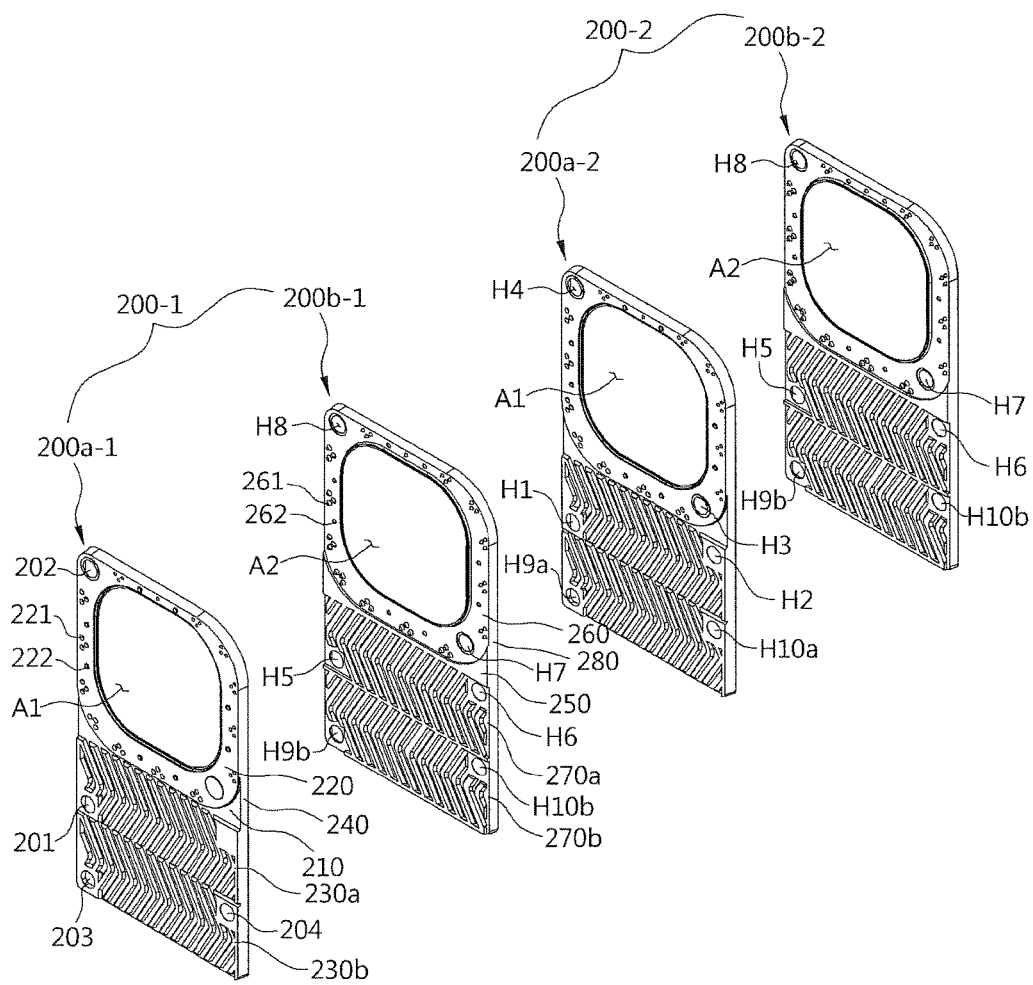

[FIG. 7]
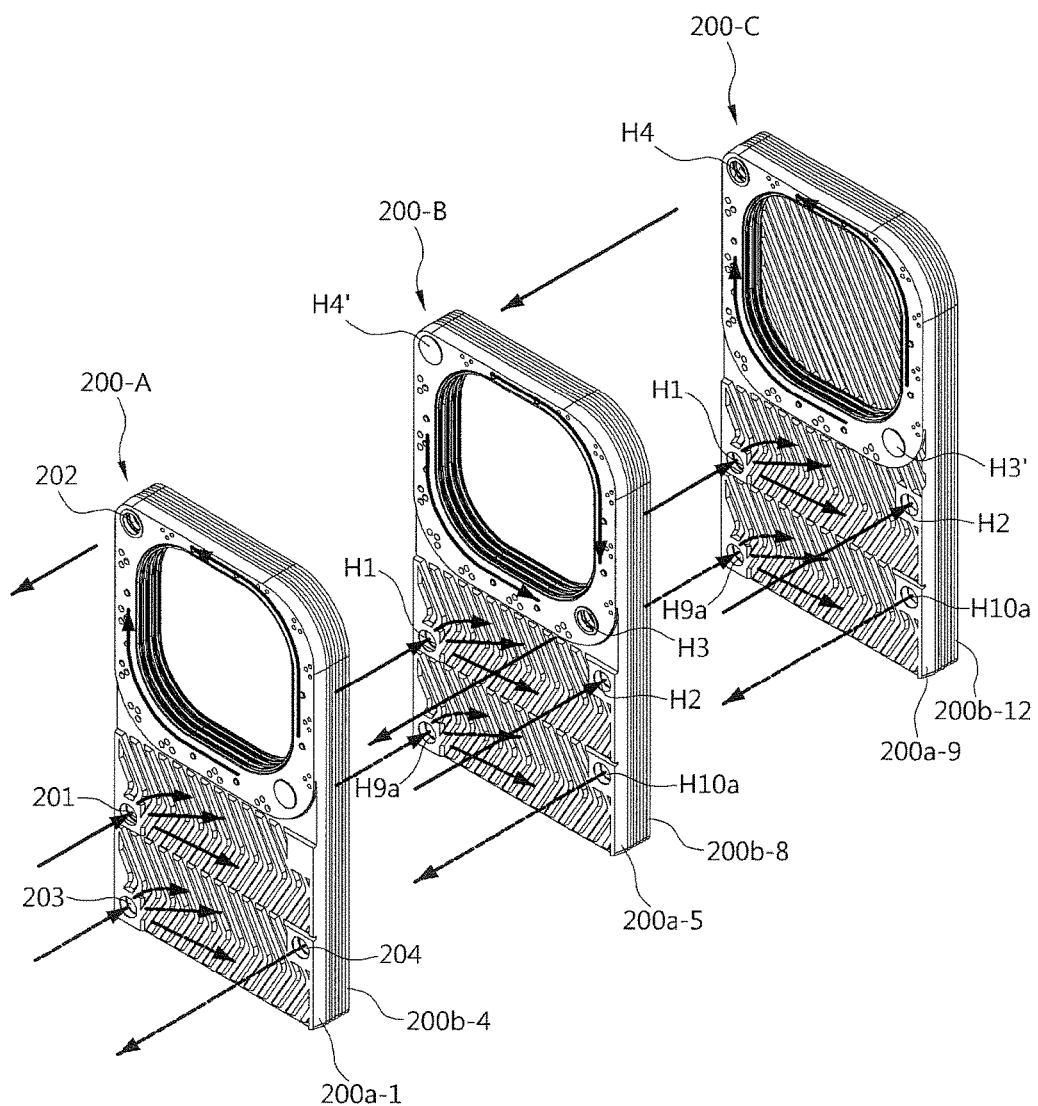

[FIG. 8]
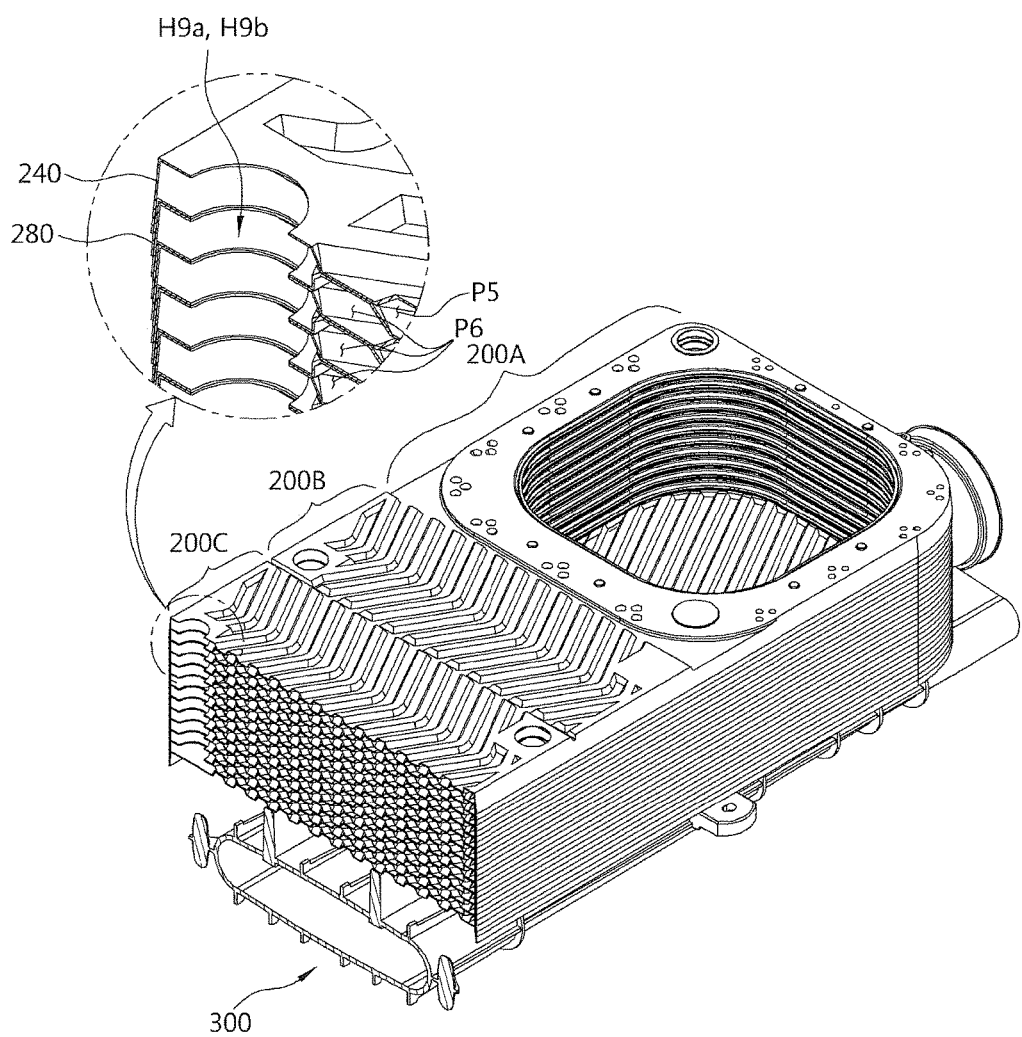

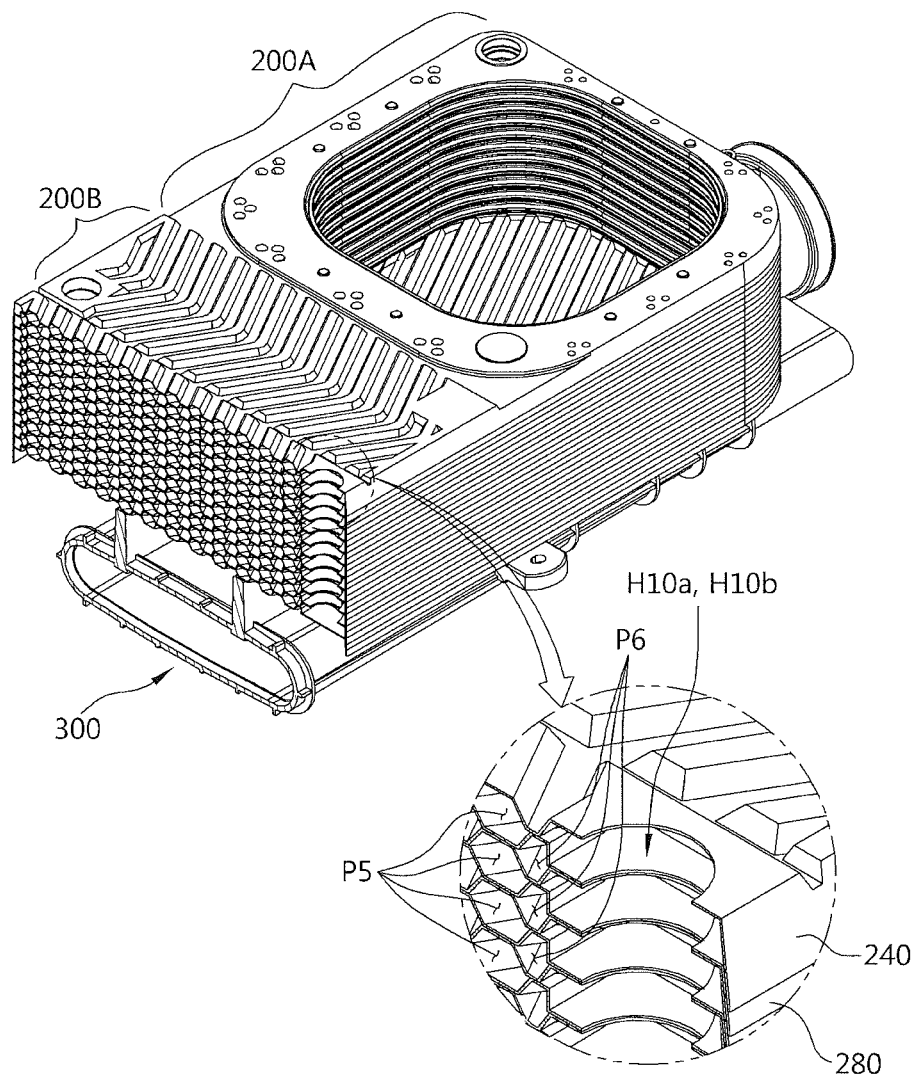
[FIG. 9]

[FIG. 10]
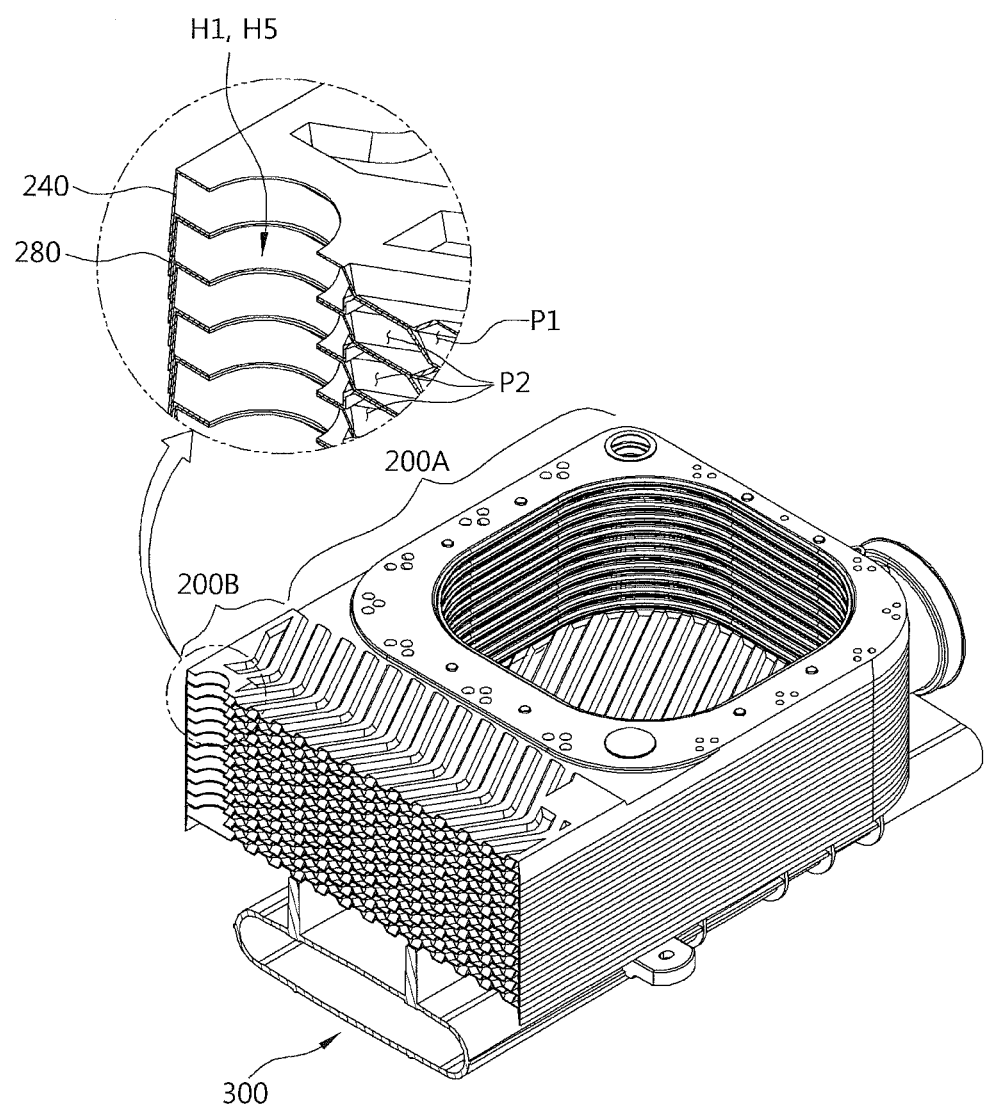

【FIG. 11】
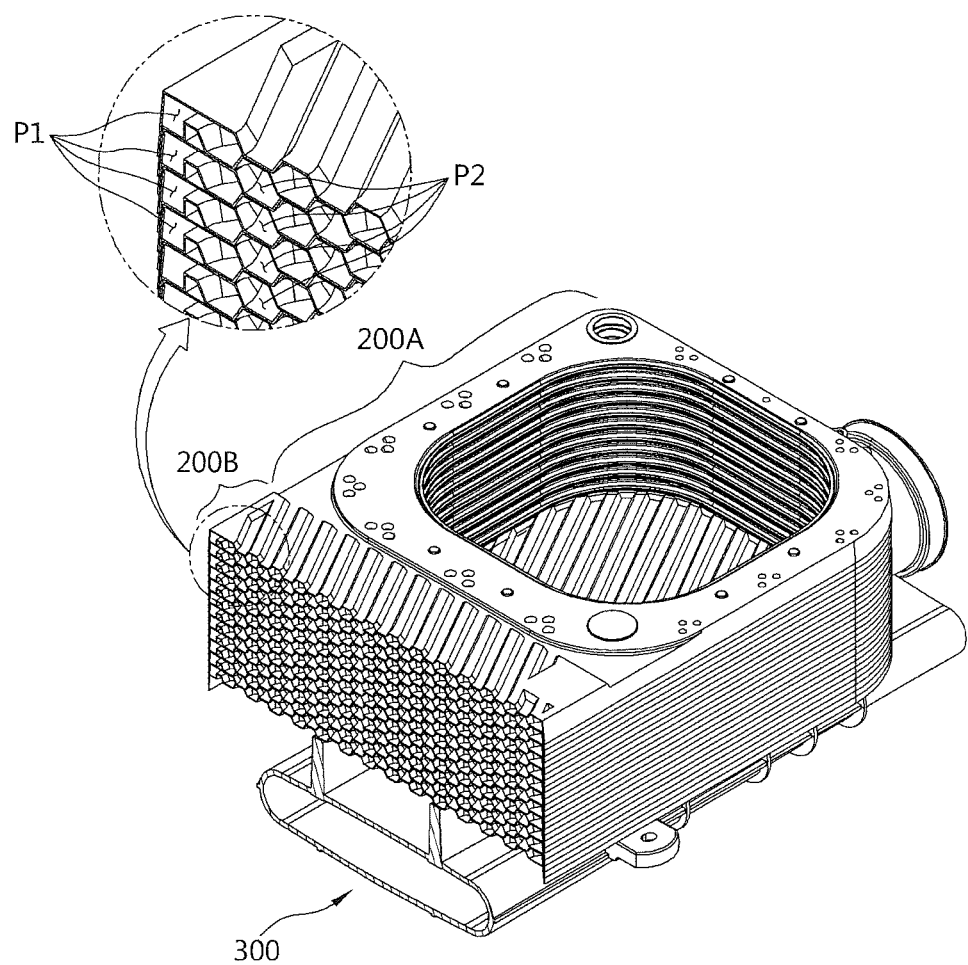

[FIG. 12]
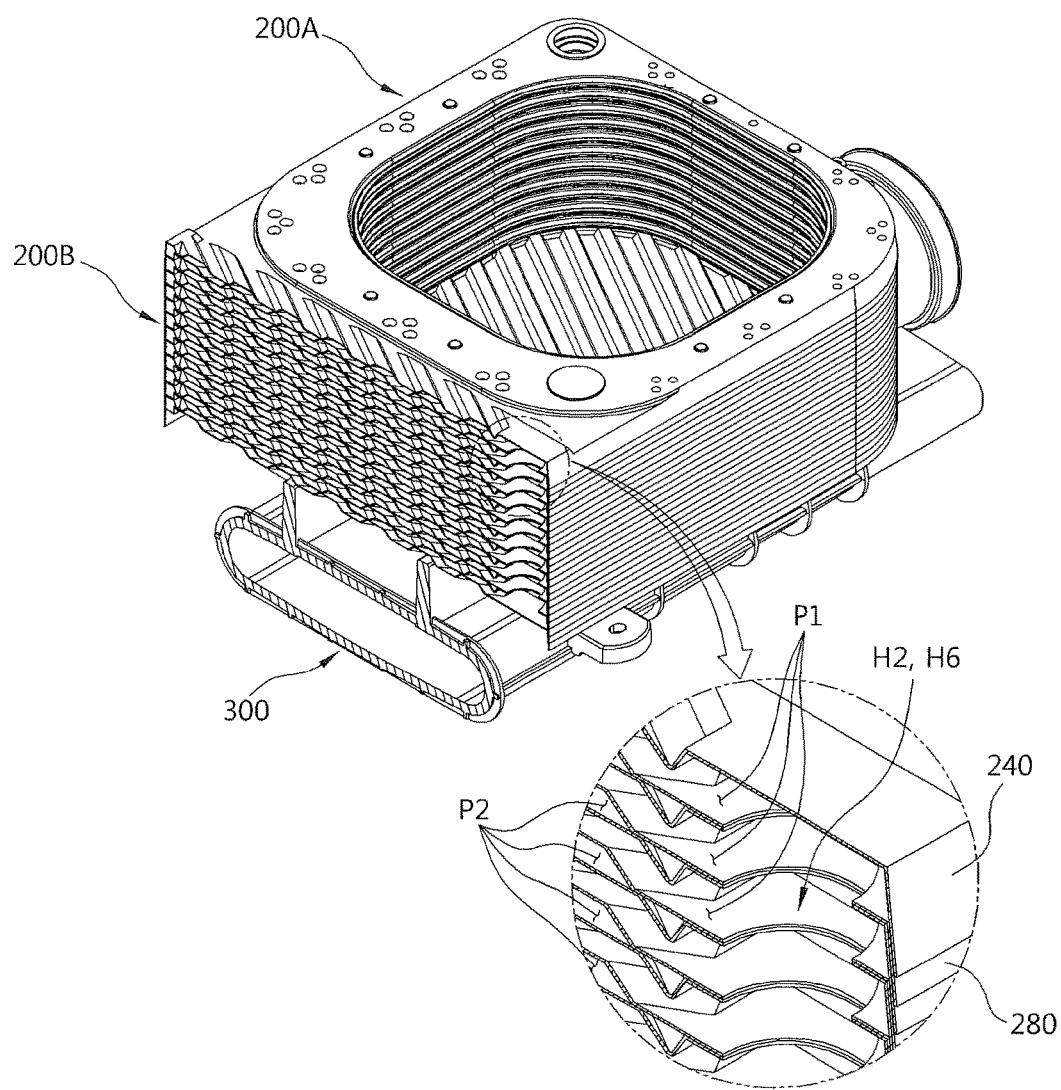

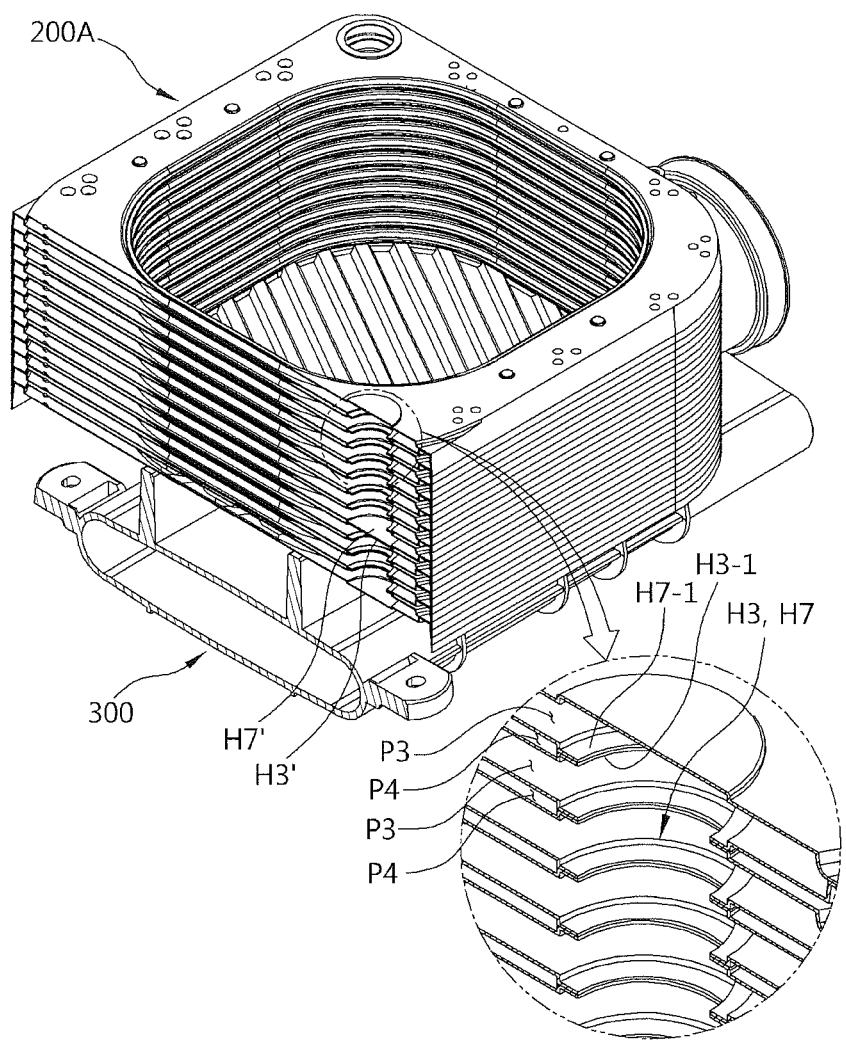
[FIG. 13]

[FIG. 14]
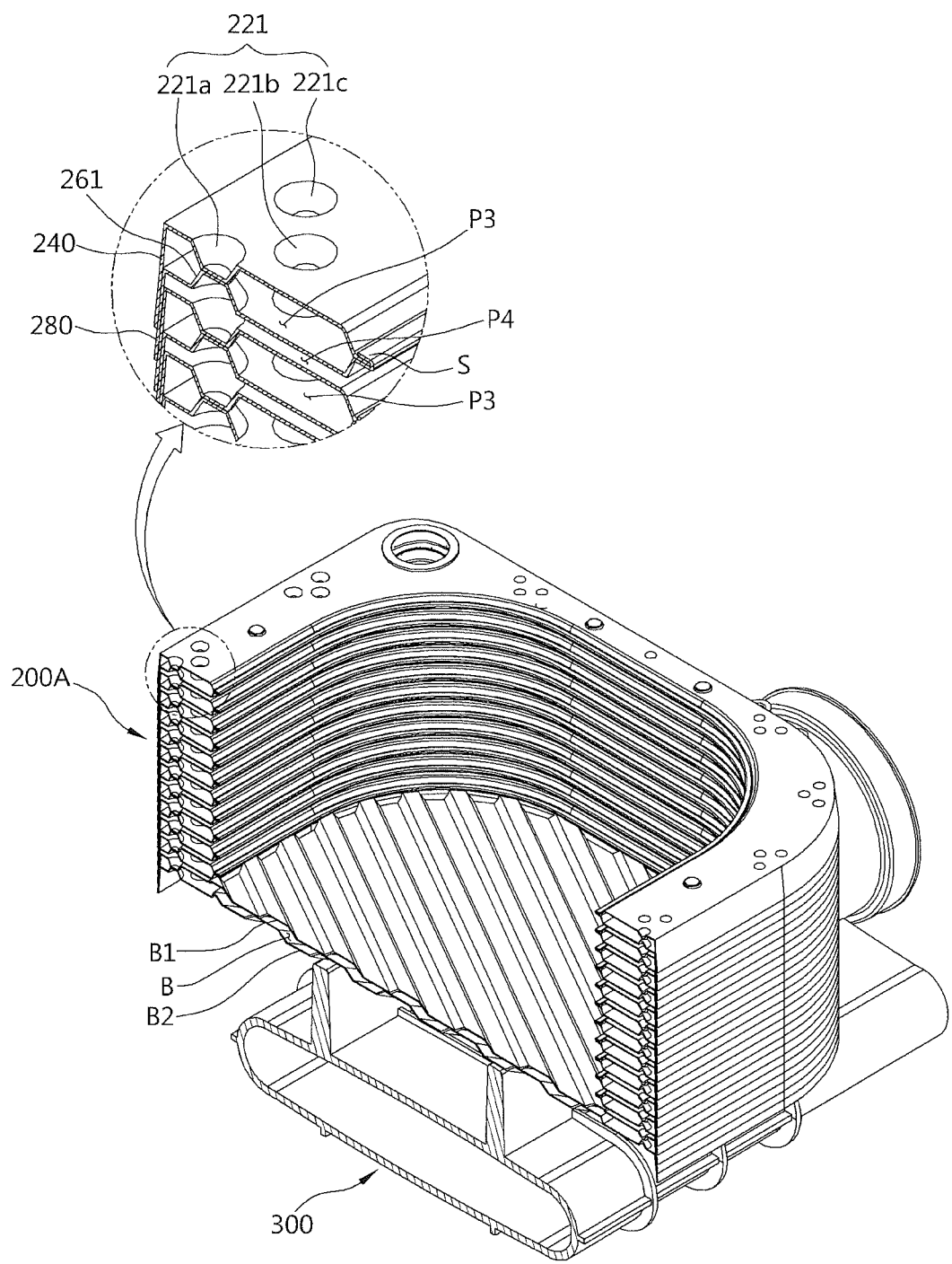

[FIG. 15]
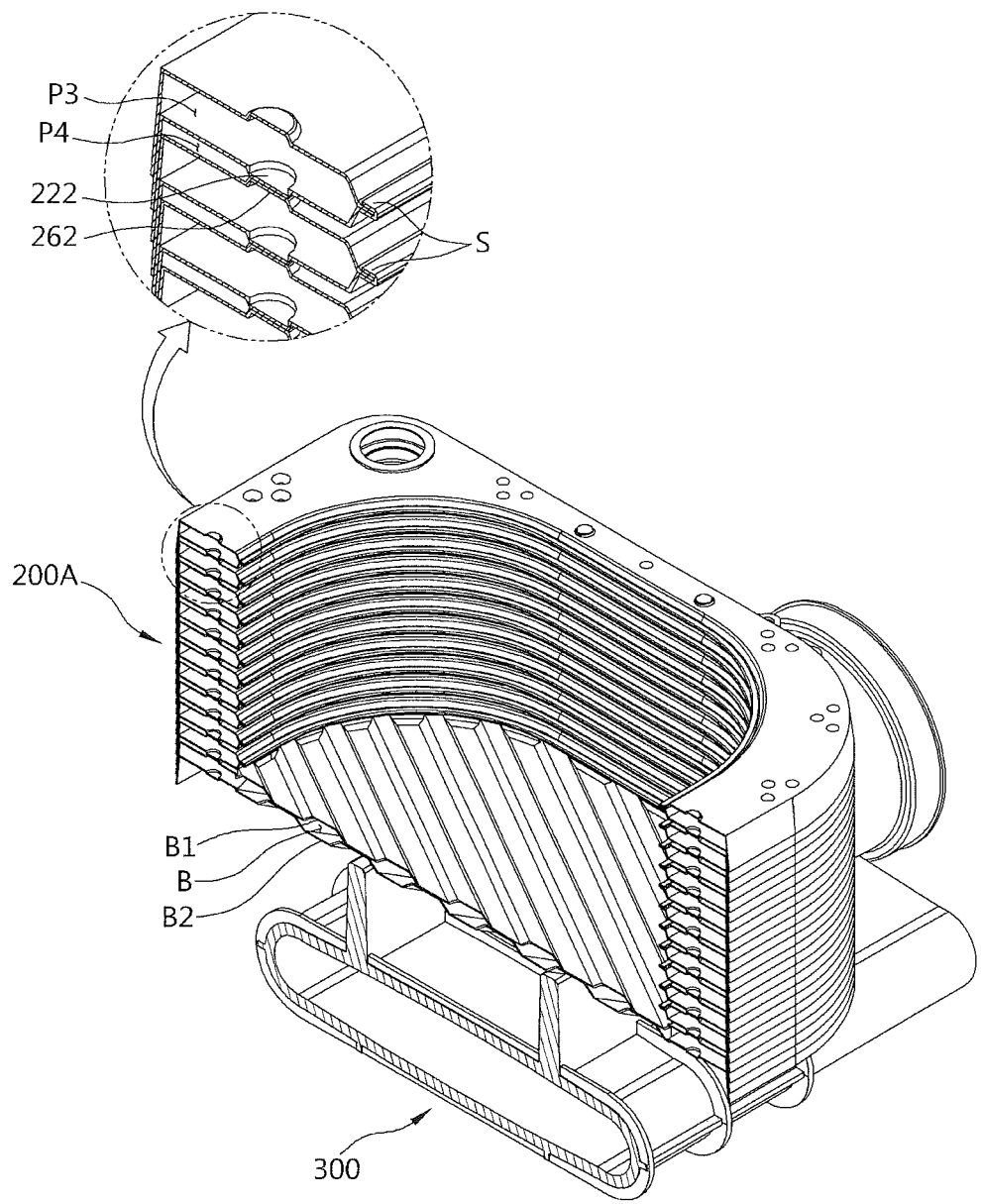

[FIG. 16]
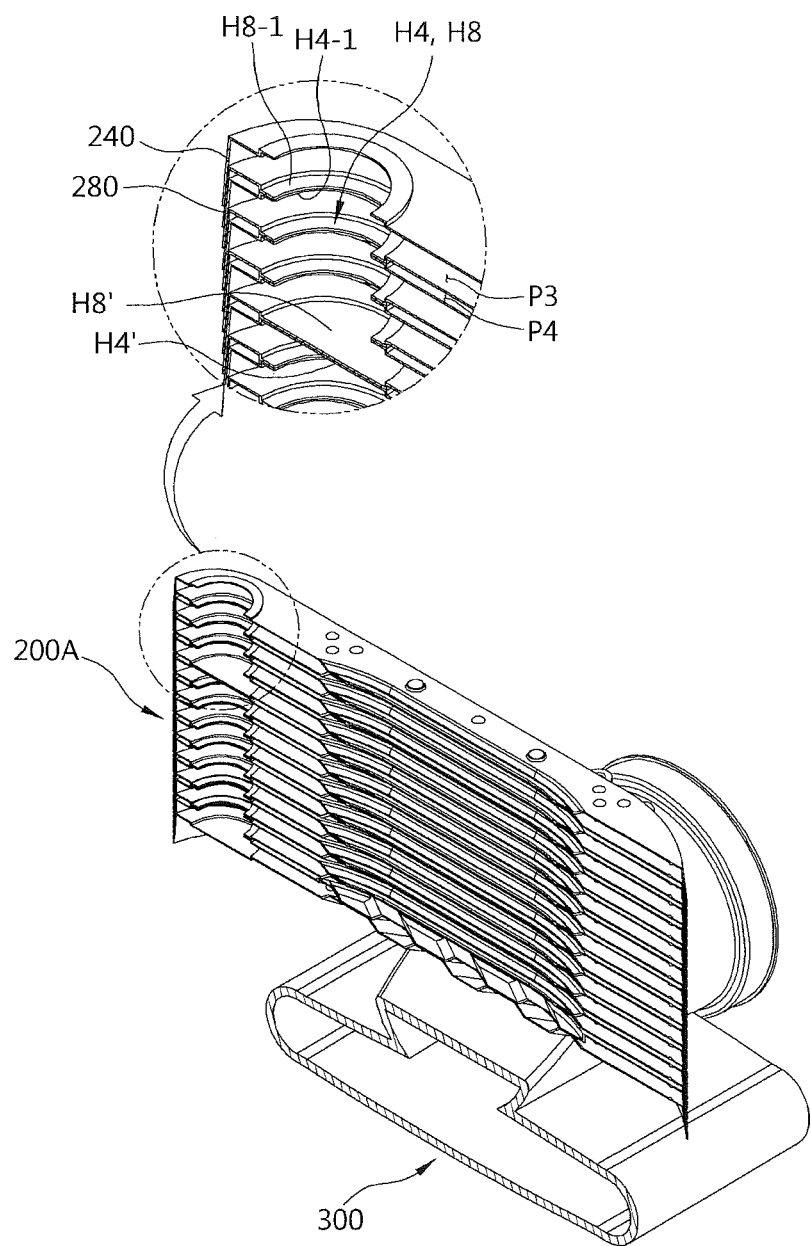

[FIG. 17]
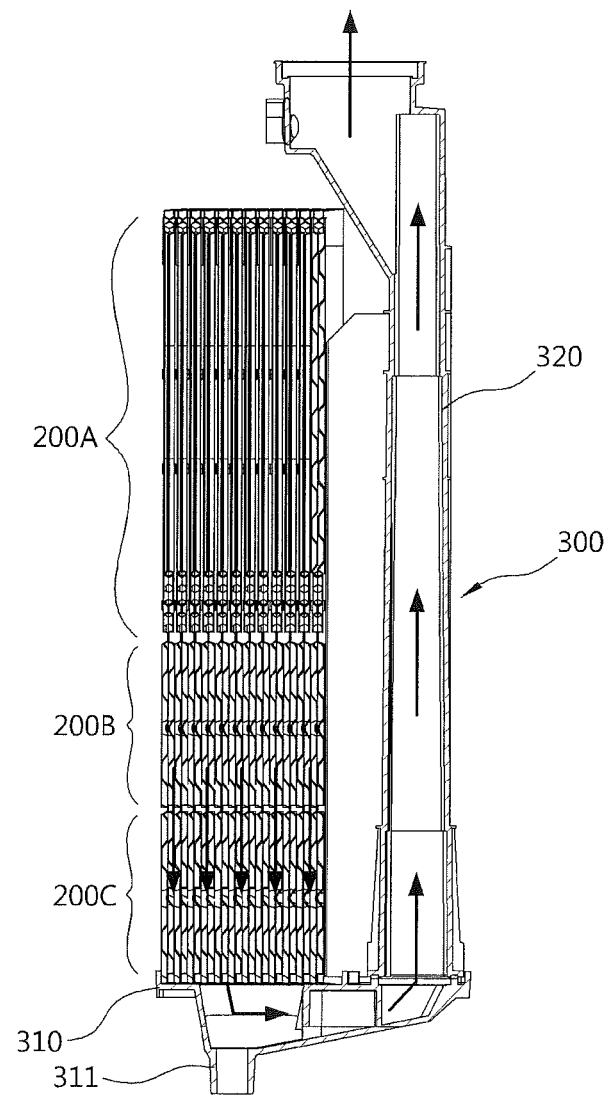

[FIG. 18]
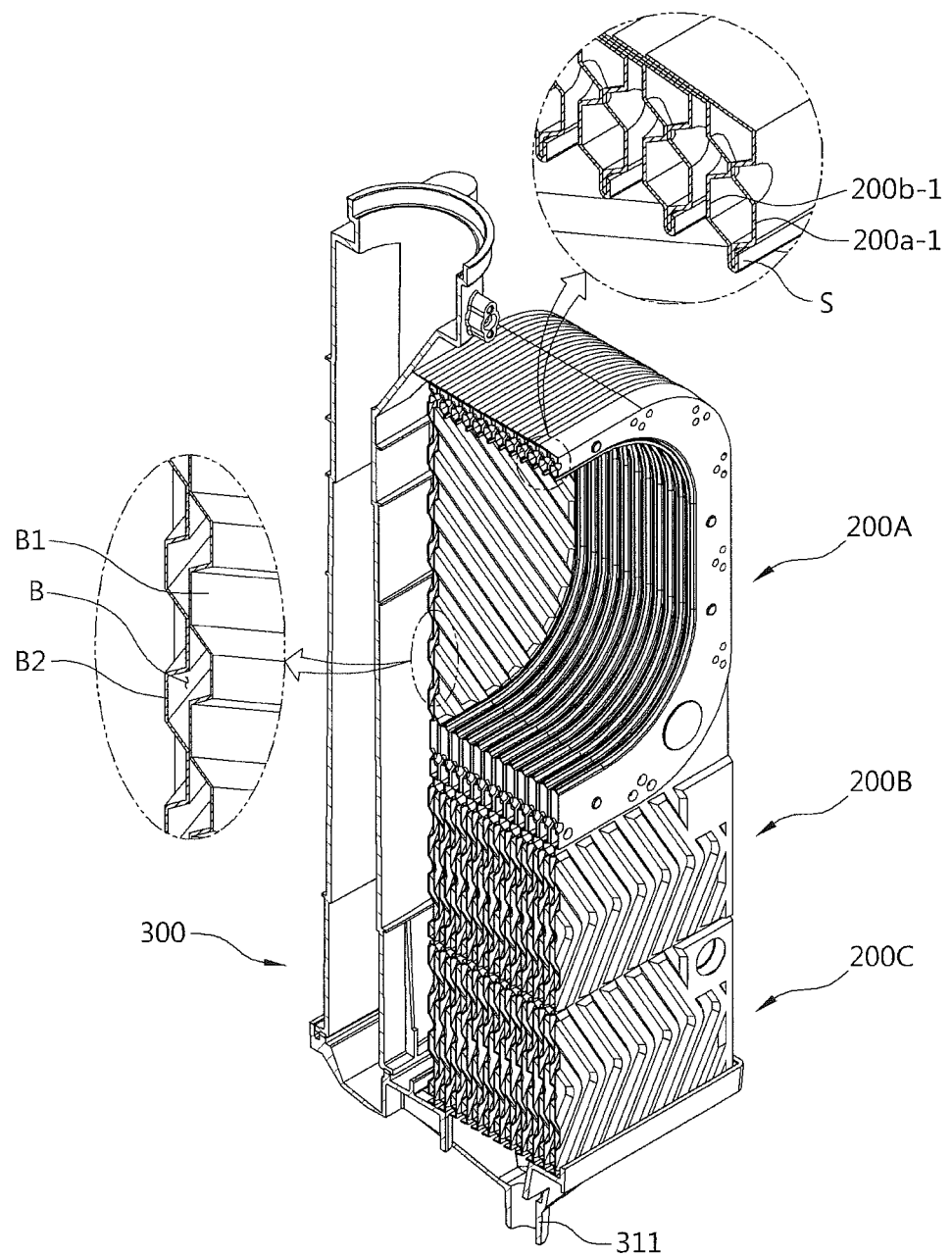

[FIG. 19]
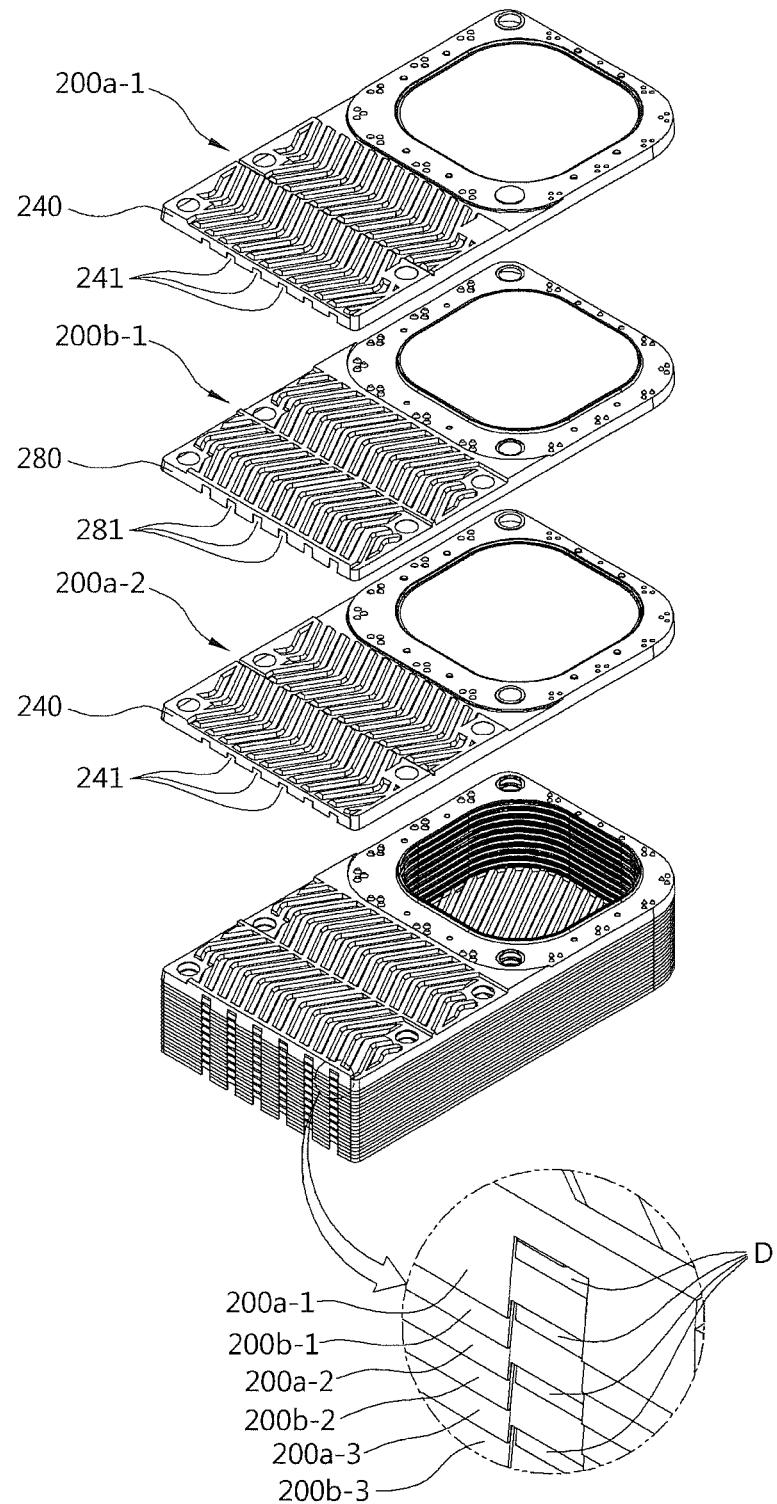

[FIG. 20]
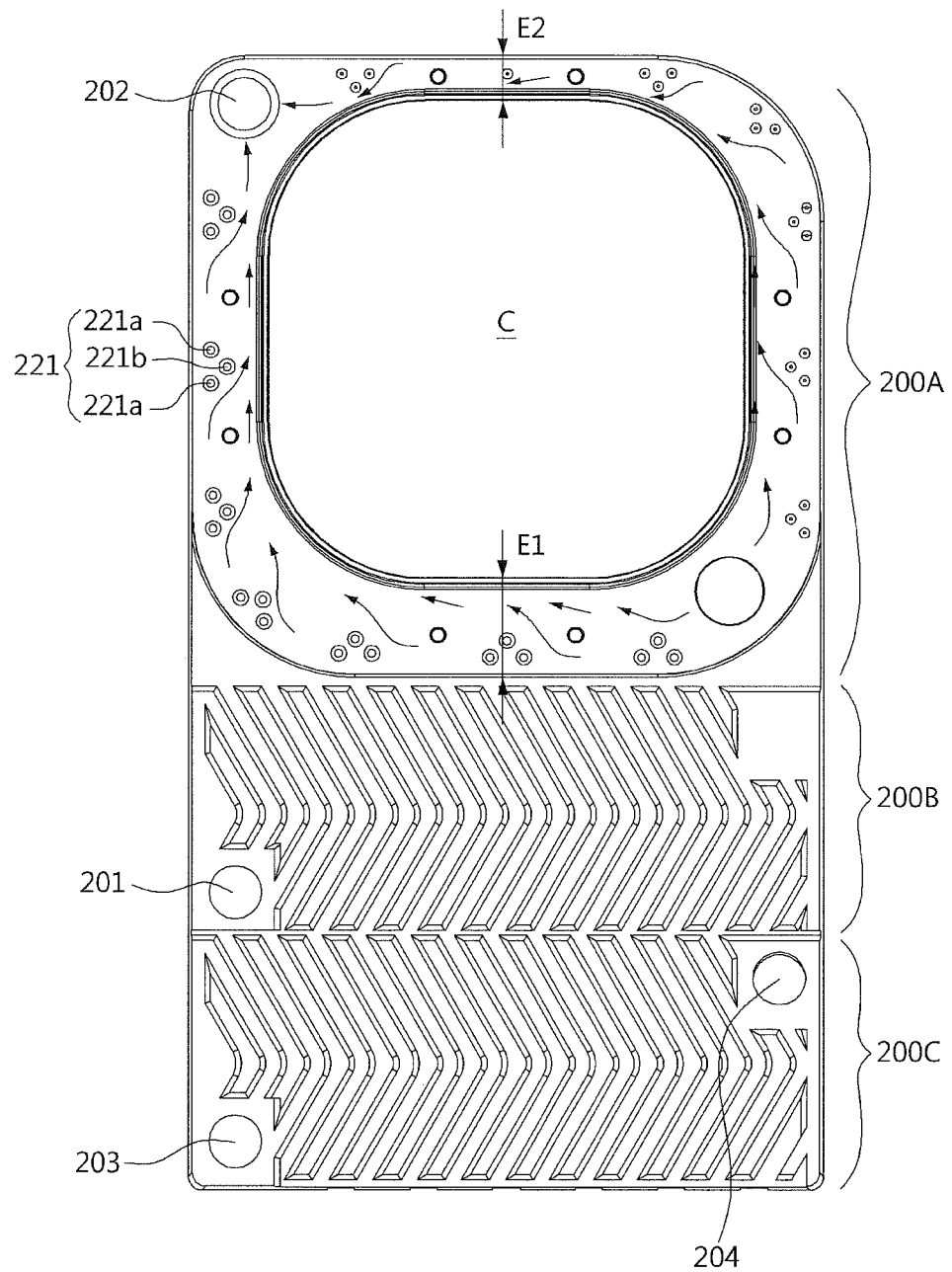

HEAT EXCHANGER

CROSS-REFERENCE TO RELATED APPLICATIONS

This application is a national stage of International Application No. PCT/KR2016/008846, filed Aug. 11, 2016, which claims the benefit of priority to Korean Application No. 10-2015-0121960, filed Aug. 28, 2015, in the Korean Intellectual Property Office, the disclosures of which are incorporated herein in their entireties by reference.

TECHNICAL FIELD

The present invention relates to a heat exchanger, and more particularly, to a heat exchanger having a simplified assembly structure by stacking a plurality of unit plates to integrally form a heating sensible heat portion, a heating latent heat portion, and a hot water latent heat portion, and capable of improving heat exchange efficiency.

BACKGROUND ART

A boiler used for heating or supplying hot water is a device configured to heat a desired area or supply hot water by heating water or direct water (hereinafter referred to as a "heating medium") being heated by a heat source, and the boiler includes a burner configured to combust a mixture of a gas and air and a heat exchanger configured to transfer combustion heat of a combustion gas to the heating medium.

A boiler produced in an early on used a heat exchanger which heats a heating medium using only sensible heat generated when a burner performs a combustion operation, but a condensing boiler, which has a sensible heat exchanger configured to absorb sensible heat of a combustion gas generated in a combustion chamber, and a latent heat exchanger configured to absorb latent heat generated by condensation of water vapor contained in the combustion gas which underwent heat exchange in the sensible heat exchanger, is recently being used to improve thermal efficiency. Such a condensing boiler is being applied to an oil boiler as well as a gas boiler, thereby contributing to an increase in boiler efficiency and a reduction in fuel cost.

A prior art related to such a condensing boiler is disclosed in Korean Registered Patent No. 10-0976032. However, in the conventional condensing type gas boiler, there is a problem in that condensing efficiency is lowered, that is, thermal efficiency is lowered since heating water absorbs heat irradiated from a burner in a heat exchanger and the heat absorbed by the heating water is used to heat direct water to hot water using only a hot water heat exchanger such that a temperature of the heating water returning after heating the hot water is high.

Further, since a sensible heat exchange portion and a latent heat exchange portion are manufactured using separate heat exchange pipes, there are problems in that a unit cost of production is high and a manufacturing process is complicated.

Meanwhile, the conventional condensing type heat exchanger including a sensible heat exchanger and a latent heat exchanger is configured with a structure in which a blower, a fuel supply nozzle, and a burner are conventionally installed above a housing, and the sensible heat exchanger and the latent heat exchanger, which each have a heat exchange fin coupled to an outer side of a heat exchange tube, are sequentially installed inside the housing below the burner. However, in the conventional condensing type heat exchanger, there is a problem in that a volume of the heat exchanger is increased due to the blower being disposed above the housing and the structures of the sensible heat exchanger and the latent heat exchanger which are individually installed inside the housing.

As a prior art for improving heat exchange efficiency and minimizing a volume while resolving such a problem, Korean Registered Patent No. 10-0813807 discloses a heat exchanger configured with a burner disposed at a central portion of the heat exchanger, and a heat exchange tube wound around a circumference of the burner in the form of a coil.

The heat exchanger disclosed in the above-described Patent has problems in that a tube is deformed into a rounded shape when the tube is formed into a flat shape and a pressure is applied to a heat transfer medium portion, and a thickness of the tube becomes thick since the tube is manufactured by being rolled up.

Further, the conventional heat exchanger is configured with a structure in which a heat exchange tube is wound around a combustion chamber in the form of a coil, and a heating medium flows in only one direction along the heat exchange tube such that there is a disadvantage in which a heat transfer area cannot be widely secured since a heat exchange between a combustion gas and the heating medium is performed only in a local space formed around the heat exchanger in the form of a coil.

DISCLOSURE

Technical Problem

The present invention has been proposed to resolve the above-described problems, and it is an objective of the present invention to provide a heat exchanger capable of improving thermal efficiency when heating and hot water are used, and, as the thermal efficiency is improved, preheating direct water to rapidly supply the hot water when the hot water is used by stacking a plurality of plates to integrally form a heating sensible heat portion, a heating latent heat portion, and a hot water latent heat portion, thereby simplifying an assembly structure and absorbing condensation latent heat of a combustion gas in the heating latent heat portion and the hot water latent heat portion.

It is another object of the present invention is to provide a heat exchanger capable of maximizing heat exchange efficiency between a heating medium and a combustion gas while securing a wide heat transfer area between the heating medium and the combustion gas by forming a flow path of the heating medium to be long in a limited space.

Technical Solution

To achieve the above-described objectives, a heat exchanger of the present invention includes a heat exchange portion (200) in which a heating water flow path through which heating water flows, a hot water flow path through which hot water flows, and a combustion gas flow path through which a combustion gas combusted in a burner (100) flows are alternately formed to be adjacent to each other in a space between a plurality of plates, wherein the heat exchange portion (200) is configured with a heating sensible heat portion (200A) configured to surround an outer side of a combustion chamber (C), configured with an area at one side of a plate, and configured to heat the heating water using sensible heat of the combustion gas generated by the combustion in the burner (100); a heating latent heat portion (200B) configured with a partial area at the other side of the plate and configured to heat the heating water using latent heat of water vapor contained in the combustion gas which underwent heat exchange in the heating sensible heat portion (200A); and a hot water latent heat portion (200C) configured with the remaining area of the other side of the plate and configured to heat direct water using latent heat of water vapor contained in the combustion gas passing through the heating latent heat portion (200B).

Advantageous Effects

In accordance with a heat exchanger of the present invention, a plurality of plates are stacked to integrally form a heating sensible heat portion, a heating latent heat portion, and a hot water latent heat portion, so that an assembling structure of the heat exchanger is simplified and condensation latent heat of a combustion gas is absorbed in the heating latent heat portion and the hot water latent heat portion such that thermal efficiency is improved when heating and hot water are used and, as the thermal efficiency is improved, direct water is preheated and then is heated using heating water when the hot water is used, thereby shortening a time required for heating the direct water, and rapidly supplying the hot water.

Further, the plurality of plates are stacked to form an upright structure such that the heating sensible heat portion is positioned at a top part of the upright structure, and the heating latent heat portion and the hot water latent heat portion are positioned at a bottom part of the upright structure, and a burner is a cylindrical burner and is inserted into a combustion chamber space from a front face thereof in a horizontal direction to be assembled such that the burner can be easily disassembled and assembled during maintenance such as cleaning of the heat exchanger and the like, and a work space for approaching to a combustion chamber side can be widely secured.

Furthermore, a plurality of unit plates manufactured in similar patterns are stacked to integrally form the hot water latent heat portion and the heating latent heat portion which each have multiple parallel flow paths, and the heating sensible heat portion having a serial flow path such that heat exchange efficiency can be maximized by forming a long flow path of the heating water in a limited space while reducing flow resistance of the hot water and the heating water.

Also, a guide portion is formed inside a heating water flow path of the heating sensible heat portion to guide the heating water to flow toward the center of the combustion chamber such that heat exchange efficiency between the heating water and combustion heat of the burner can be improved.

In addition, a heating water flow path, a hot water flow path, and a combustion gas flow path are formed inside a heat exchange portion which is formed by stacking the plurality of unit plates, and an outer wall structure sealing an outer side surface through which the combustion gas passes is also integrally formed, such that an installation structure of the heat exchanger can be simplified, and a plurality of combustion gas pass-through portions are formed at a lower portion of the hot water latent heat portion at regular intervals such that flow resistance of the combustion gas can be reduced, and generation of noise and vibration can be minimized.

Additionally, a connection passage for the heating water is provided behind the heating sensible heat portion to allow the heating water passing through a heating water flow path of the heating latent heat portion to flow into the heating water flow path of the heating sensible heat portion, and a water housing cooling portion configured to insulate the combustion chamber is also provided such that an insulation structure of the combustion chamber can be simplified and flow resistance of the heating water can be reduced.

DESCRIPTION OF DRAWINGS

FIG. 1 is a block diagram of a condensing gas boiler including a heat exchanger according to the present invention.

FIG. 2 is a perspective view of the heat exchanger according to the present invention.

FIG. 3 is a right side view of the heat exchanger according to the present invention.

FIG. 4 is a front view of the heat exchanger according to the present invention.

FIG. 5 is an exploded perspective view of the heat exchanger according to the present invention.

FIG. 6 is an enlarged perspective view of a portion of a unit plate shown in FIG. 5.

FIG. 7 is a perspective view illustrating a flow path of heating water passing through a heating latent heat portion and a heating sensible heat portion, and a flow path of hot water passing through a hot water latent heat portion.

FIG. 8 is a perspective view taken along line A-A of FIG. 4.

FIG. 9 is a perspective view taken along line B-B of FIG. 4.

FIG. 10 is a perspective view taken along line C-C of FIG. 4.

FIG. 11 is a perspective view taken along line D-D of FIG. 4.

FIG. 12 is a perspective view taken along line E-E of FIG. 4.

FIG. 13 is a perspective view taken along line F-F of FIG. 4.

FIG. 14 is a perspective view taken along line G-G of FIG. 4.

FIG. 15 is a perspective view taken along line H-H of FIG. 4.

FIG. 16 is a perspective view taken along line I-I of FIG. 4.

FIG. 17 is a perspective view taken along line J-J of FIG. 4.

FIG. 18 is a perspective view taken along line K-K of FIG. 4.

FIG. 19 is a perspective view illustrating a state in which a combustion gas pass-through portion is formed at a lower portion of the hot water latent heat portion.

FIG. 20 is a diagram illustrating a state in which the heating water is guided in a direction toward an inner side of a combustion chamber by a guide portion.

| ** Description of Reference Numerals ** | |
|---|---|
| 1: heat exchanger | 11: heating return water inflow pipe |
| 12: heating return water discharge pipe | |
| 13: heating water supply pipe | 14: bypass pipe |
| 15: direct water inflow pipe | 16: hot water discharge pipe |
| 17: hot water supply pipe | 100: burner |
| 200: heat exchange portion | 200A: heating sensible heat portion |

-continued

| | |
|---|---|
| 200B: heating latent heat portion | |
| 200C: hot water latent heat portion | |
| 200-1 to 200-12: unit plates | 200a-1 to 200a-12: first plates |
| 200b-1 to 200b-12: second plates | |
| 200-A: first plate group | 200-B: second plate group |
| 200-C: third plate group | 201: heating water inlet |
| 202: heating water outlet | 203: direct water inlet |
| 204: hot water outlet | 210: first plane portion |
| 220: first protrusion | 221: first guide portion |
| 222: first gap maintaining portion | |
| 230a: second protrusion | 230b: third protrusion |
| 240: first flange | 241: first incised portion |
| 250: second plane portion | 260: first recess |
| 261: second guide portion | 262: second gap maintaining portion |
| 270a: second recess | 270b: third recess |
| 280: second flange | 281: second incised portion |
| 300: combustion gas discharge portion | |
| 310: lower cover | 311: condensation discharge pipe |
| 320: combustion gas discharge pipe | |
| A1: first opening | A2: second opening |
| B: water housing cooling portion | |
| B1: first insulating plate | B2: second insulating plate |
| C: combustion chamber | D: combustion gas pass-through portion |
| H1 to H10b: through-holes | H3' and H7': first blocked portions |
| H4' and H8': second blocked portions | |
| H3-1 and H4-1: first flanges | H7-1 and H8-1: second flanges |
| P1: heating latent heat portion heating water flow path | |
| P2: heating latent heat portion combustion gas flow path | |
| P3: heating sensible heat portion heating water flow path | |
| P4: heating sensible heat portion combustion gas flow path | |
| P5: hot water latent heat portion hot water flow path | |
| P6: hot water latent heat portion combustion gas flow path | |

MODES OF THE INVENTION

Hereinafter, configurations and operations for preferred embodiments of the present invention will be described in detail with reference to the accompanying drawings.

A condensing gas boiler provided with a heat exchanger of the present invention will be first described with reference to FIG. 1. The condensing gas boiler provided with a heat exchanger 1 of the present invention includes an expansion tank 20 configured to store heating water flowing in through a heating return water inflow pipe 11; a circulation pump 30 configured to circulate the heating water discharged from the expansion tank 20 through a heating return water discharge pipe 12; the heat exchanger 1 in which a heat exchange is performed between a combustion gas generated in a burner 100, and the heating water and direct water; a three-way valve 40 configured to supply the heating water to a heating water supply pipe 13 during heating and to a bypass pipe 14 of a hot water heat exchanger 50 when hot water is used; and the hot water heat exchanger 50 in which a heat exchange is indirectly performed between the heating water and the hot water.

A heat exchange portion 200 of the heat exchanger 1 includes a heating sensible heat portion 200A configured to heat the heating water using sensible heat of the combustion gas, a heating latent heat portion 200B configured to heat the heating water using latent heat of the combustion gas passing through the heating sensible heat portion 200A, and a hot water latent heat portion 200C configured to heat the direct water by latent heat of the combustion gas passing through the heating latent heat portion 200B to generate and supply hot water to the hot water heat exchanger 50.

The direct water flowing in through a direct water inflow pipe 15 is heated in the hot water latent heat portion 200C and then supplied to the hot water heat exchanger 50 through a hot water discharge pipe 16. In this case, the heating water supplied from the heating sensible heat portion 200A and the hot water supplied from the hot water latent heat portion 200C undergo a heat exchange in the hot water heat exchanger 50 such that the hot water having a temperature desired by a user is supplied through a hot water supply pipe 17.

The heating water pressure-transferred by the circulation pump 30 is first supplied to the heating latent heat portion 200B and undergoes a primary heat exchange with the combustion gas generated in the burner 100, and the heating water passing through the heating latent heat portion 200B is supplied to the heating sensible heat portion 200A, undergoes a secondary heat exchange with the combustion gas, and then is supplied to a site requiring heating through the heating water supply pipe 13.

A configuration and an operation of the heat exchanger 1 according to the present invention will be described below.

Referring to FIGS. 2 to 7, a heat exchanger 1 according to one embodiment of the present invention includes a burner 100 configured to combust a mixture of air and fuel to generate combustion heat and a combustion gas; a heat exchange portion 200 provided at a circumference of the burner 100 to perform a heat exchange between a heating medium and the combustion gas generated by the combustion in the burner 100, and constituted by stacking a plurality of plates; and a combustion gas discharge portion 300 configured to discharge a combustion gas passing through the heat exchange portion 200.

The burner 100 is a cylindrical burner and is assembled by being inserted into a space of a combustion chamber C provided at the heat exchange portion 200 in a horizontal direction from a front surface, thereby improving convenience of detaching the burner 100 and maintenance work of the heat exchanger 1.

The heat exchange portion 200 is configured with a heating sensible heat portion 200A configured to surround an outer side of the combustion chamber C and configured to form one side area of each of the plurality of plates and heat heating water using sensible heat of the combustion gas generated by the combustion in the burner 100; a heating latent heat portion 200B configured to form a partial area of the other side of each of the plurality of plates and heat the heating water using latent heat of water vapor contained in the combustion gas which underwent a heat exchange in the heating sensible heat portion 200A; and a hot water latent heat portion 200C configured to form the remaining area of the other side of each of the plurality of plates and heat direct water using latent heat of water vapor contained in the combustion gas passing through the heating latent heat portion 200B, thereby generating hot water. The plurality of plates are disposed in an upright structure and stacked in a front-rear direction to allow the heating sensible heat portion 200A to be disposed at a top part, and the heating latent heat portion 200B and the hot water latent heat portion 200C to be disposed at a bottom part.

The combustion gas discharge portion 300 is configured with a lower cover 310 covering a lower portion of the hot water latent heat portion 200C, and a combustion gas discharge pipe 320 having a side connected to the lower cover 310 and extending upward. A condensation discharge pipe 311 configured to discharge condensation generated at the hot water latent heat portion 200C is connected to a lower portion of the lower cover 310.

Configurations and operations of the plurality of plates, the heating sensible heat portion 200A, the heating latent heat portion 200B, and the hot water latent heat portion 200C, which constitute the heat exchange portion 200, will be described below.

The heat exchange portion 200 is configured such that the plurality of plates are stacked from a front side to a rear side, and the heating sensible heat portion 200A disposed at the top part and the heating latent heat portion 200B and the hot water latent heat portion 200C which are disposed at the bottom part are integrally formed with the plurality of plates.

As one example, the plurality of plates may be configured with first to twelfth unit plates 200-1, 200-2, 200-3, 200-4, 200-5, 200-6, 200-7, 200-8, 200-9, 200-10, 200-11, and 200-12, and the unit plates are configured with first plates 200a-1, 200a-2, 200a-3, 200a-4, 200a-5, 200a-6, 200a-7, 200a-8, 200a-9, 200a-10, 200a-11, and 200a-12, which are disposed at front sides of the unit plates, and second plates 200b-1, 200b-2, 200b-3, 200b-4, 200b-5, 200b-6, 200b-7, 200b-8, 200b-9, 200b-10, 200b-11, and 200b-12, which are disposed at back sides of the unit plates.

Referring to FIGS. 8 to 18, a heating latent heat portion heating water flow path P1, a heating sensible heat portion heating water flow path P3, and a hot water latent heat portion hot water flow path P5 are formed between the first plate and the second plate which constitute each of the unit plates, and a heating latent heat portion combustion gas flow path P2, a heating sensible heat portion combustion gas flow path P4, and a hot water latent heat portion combustion gas flow path P6 are formed between a second plate constituting a unit plate disposed at one side of unit plates stacked adjacent to each other and a first plate constituting a unit plate disposed at the other side thereof.

Referring to FIGS. 5 and 6, the first plate is configured with a first plane portion 210; a first protrusion 220 protruding from one side of the first plane portion 210 toward a front side, having a central portion at which a first opening A1 is formed, and configured to constitute the heating sensible heat portion 200A; a second protrusion 230a protruding from the other side of the first plane portion 210 toward the front side and configured to form the heating latent heat portion 200B; a third protrusion 230b protruding from one side of the second protrusion 230a toward the front side and configured to form the hot water latent heat portion 200C; and a first flange 240 bent at an edge of the first plate toward a rear side.

In the first plate 200a-1 disposed at the foremost position of the first plates, a heating water inlet 201 is formed at one side of a lower portion of the heating latent heat portion 200B, a heating water outlet 202 is formed at one side of an upper portion of the heating sensible heat portion 200A, a direct water inlet 203 is formed at one side of a lower portion of the hot water latent heat portion 200C, and a hot water outlet 204 is formed at one side of an upper portion of the hot water latent heat portion 200C.

In the first plates 200a-2 to 200a-12 of the first plates, which are sequentially stacked in the rear side of the first plate 200a-1 disposed at the foremost position, a first through-hole H1 is formed at the one side of the lower portion of the heating latent heat portion 200B, a second through-hole H2 is formed at one side of an upper portion of the heating latent heat portion 200B, a third through-hole H3 is formed at one side of a lower portion of the heating sensible heat portion 200A, a fourth through-hole H4 is formed at the other side of the upper portion of the heating sensible heat portion 200A, a ninth through-hole H9a is formed at the one side of the lower portion of the hot water latent heat portion 200C, and a tenth through-hole H10a is formed at the one side of the upper portion of the hot water latent heat portion 200C.

The second plate is configured with a second plane portion 250; a first recess 260 recessed from one side of the second plane portion 250 to the rear side to form the heating sensible heat portion heating water flow path P3 between the first protrusion 220 and the first recess 260, and having a central portion at which a second opening A2 corresponding to the first opening A1 is formed; a second recess 270a recessed from the other side of the second plane portion 250 to the rear side to form the heating latent heat portion heating water flow path P1 between the second protrusion 230a and the second recess 270a; a third recess 270b recessed from one side of the second recess 270a to the rear side to form the hot water latent heat portion hot water flow path P5 between the third protrusion 230b and the third recess 270b; and a second flange 280 bent at an edge of the second plate to the rear side.

In the second plate, a fifth through-hole H5 is formed at the one side of the lower portion of the heating latent heat portion 200B, a sixth through-hole H6 is formed at the one side of the upper portion of the heating latent heat portion 200B, a seventh through-hole H7 is formed at the one side of the lower portion of the heating sensible heat portion 200A, an eighth through-hole H8 is formed on the other side of the upper portion of the heating sensible heat portion 200A, a ninth through-hole H9b is formed at the one side of the lower portion of the hot water latent heat portion 200C, and a tenth through-hole H10b is formed at the one side of the upper portion of the hot water latent heat portion 200C.

Further, first blocked portions H3' and H7' are formed at the other side of the lower portion of the heating sensible heat portion 200A in the first plate 200a-9 of the ninth unit plate 200-9 and the second plate 200b-8 of the eighth unit plate 200-8, and second blocked portions H4' and H8' are formed at the one side of the upper portion of the heating sensible heat portion 200A in the first plate 200a-5 of the fifth unit plate 200-5 and the second plate 200b-4 of the fourth unit plate 200-4. The first blocked portions H3' and H7' and the second blocked portions H4' and H8' are configured to change a flow path of the heating water passing through the heating sensible heat portion heating water flow path P3 to form a serial flow path, and operations thereof will be described below.

Meanwhile, referring to FIGS. 13 and 16, first flanges H3-1 and H4-1 are respectively formed at the through-holes H3 and H4 to protrude toward the heating sensible heat portion combustion gas flow path P4, and second flanges H7-1 and H8-1 are respectively formed at the through-holes H7 and H8 to protrude toward the heating sensible heat portion combustion gas flow path P4 and to be in contact with ends of the first flanges H3-1 and H4-1.

According to the configurations of the first flanges H3-1 and H4-1 and the second flanges H7-1 and H8-1, the heating sensible heat portion heating water flow path P3 and the heating sensible heat portion combustion gas flow path P4 are spatially separated and a gap between the heating sensible heat portion heating water flow path P3 and the heating sensible heat portion combustion gas flow path P4 may also be constantly maintained.

Further, referring to FIGS. 14, 15 and 18, a water housing cooling portion B configured to provide a connection passage for the heating water to direct the heating water which passes through the heating water flow path of the heating latent heat portion 200B to flow into the heating water flow path of the heating sensible heat portion 200A and insulate the combustion chamber C is formed behind the heating sensible heat portion 200A.

The water housing cooling portion B is configured such that the heating water is filled in a space between a first insulating plate B1 formed at the first plate 200a-12 of the unit plate 200-12 disposed at the rearmost position, and a second insulating plate B2 formed at the second plate 200b-12 of the unit plate 200-12. Protrusions and recesses, which each have a comb shape, may be formed to intersect each other on the first insulating plate B1 and the second insulating plate B2, and thus turbulence is generated in a flow of the heating water passing through the water housing cooling portion B.

According to the configuration of the water housing cooling portion B, heat insulation of the combustion chamber C is possible without separate insulation being installed to prevent overheating of the heat exchanger 1, and thus the connection passage for the heating water configured to connect the heating latent heat portion heating water flow path P1 and the heating sensible heat portion heating water flow path P3 may be widely secured in a space between the first insulating plate B1 and the second insulating plate B2 such that flow path resistance of the heating water can be reduced. Further, the heating sensible heat portion heating water flow path P3 through which the heating water flows is provided at an outer wall surrounding the combustion chamber C and thus heat insulation of the outer wall of the combustion chamber C is possible such that the heat insulation of the combustion chamber C may be achieved across an entire area thereof by the water housing cooling portion B and the heating sensible heat portion heating water flow path P3.

Meanwhile, the second protrusion 230a and the second recess 270a, and the third protrusion 230b and the third recess 270b may be formed in comb shapes bent in opposite directions. In this case, when the first plate and the second plate are stacked, the first plane portion 210 and the second plane portion 250 are in contact, the heating latent heat portion heating water flow path P1 through which the heating water flows is formed between the second protrusion 230a and the second recess 270a which are bent in the opposite directions in a single unit plate, and the heating latent heat portion combustion gas flow path P2 through which the combustion gas flows is formed between the second recess 270a of one of adjacently stacked unit plates and the second protrusion 230a of the other thereof. Further, the hot water latent heat portion hot water flow path P5 through which the hot water flows is formed between the third protrusion 230b and the third recess 270b which are bent in opposite directions, and the hot water latent heat portion combustion gas flow path P6 through which combustion gas flows is formed between the third recess 270b of one of adjacently stacked unit plates and the third protrusion 230b of the other thereof.

As described above, the second protrusion 230a and the second recess 270a, and the third protrusion 230b and the third recess 270b are configured to be in comb shapes bent in the opposite directions, and thus turbulence is generated in a flow of the heating water passing through the heating latent heat portion heating water flow path P1, in a flow of the combustion gas passing through the heating latent heat portion combustion gas flow path P2, in a flow of the hot water passing through the hot water latent heat portion hot water flow path P5, and in a flow of the combustion gas passing through the hot water latent heat portion combustion gas flow path P6 such that heat exchange efficiency can be increased.

Referring to FIGS. 8 and 19, when the first plate and the second plate are stacked, the first flange 240 and the second flange 280 partially overlap each other, and the overlapping portions are weld-coupled such that an outer wall of the heat exchange portion 200 is formed.

Further, in a state in which the first flange 240 and the second flange 280 of adjacent plates overlap each other, a combustion gas pass-through portion D through which the combustion gas flowing in the hot water latent heat portion combustion gas flow path P6 passes toward the combustion gas discharge portion 300 is formed at some portions of edges of the plurality of plates.

To this end, a plurality of first incised portions 241 are formed at a combustion gas discharge side of the first flange 240, a plurality of second incised portions 281 are formed at a combustion gas discharge side of the second flange 280, and the combustion gas pass-through portions D are formed at some portions of the first incised portions 241 and the second incised portions 281 when the first plate and the second plate are stacked.

A plurality of combustion gas pass-through portions D are formed at the lower portion of the hot water latent heat portion 200C to be spaced a predetermined distance apart from each other in a lateral direction and a longitudinal direction, and thus the combustion gas passing through the hot water latent heat portion 200C may be distributed and discharged at a uniform flow rate across an entire area of the lower portion of the hot water latent heat portion 200C such that each of the combustion gas pass-through portions D serves to prevent noise and vibration and reduce flow resistance of the combustion gas passing through the hot water latent heat portion 200C and discharged to the combustion gas discharge portion 300.

Meanwhile, guide portions 221 and 261 configured to guide the heating water to flow toward the center of the combustion chamber C are formed at the heating water flow path P3 of the heating sensible heat portion 200A. A plurality of guide portions 221 and a plurality of guide portions 261 are formed and spaced apart from each other at an outer side portion of the heating sensible heat portion 200A in a circumferential direction thereof. Here, the outer side portion of the heating sensible heat portion 200A is an area between an intermediate portion and an outer end of the heating sensible heat portion 200A in a width direction, and refers to an area adjacent to the outer end thereof.

The guide portions 221 and 261 include the plurality of first guide portions 221 protruding from the first plate toward the heating sensible heat portion heating water flow path P3, and the plurality of second guide portions 261 protruding from the second plate toward the heating sensible heat portion heating water flow path P3 and formed at positions corresponding to the plurality of first guide portions 221.

Referring to FIGS. 14 and 20, a protruding end of the first guide portion 221 and a protruding end of the second guide portion 261 are in contact with each other to enhance coupling strength between the first plate and the second plate.

The first guide portion 221 may be configured with a first guide 221a disposed on a front side on the basis of a flow direction of the heating water, a second guide 221b disposed to be spaced in a diagonal direction toward the combustion chamber C from a rear side of the first guide 221a, and a third guide 221c disposed to be spaced apart from the rear side of the first guide 221a, and the second guide portion 261 may also be configured to correspond to the first guide portion 221.

With such configurations of the guide portions 221 and 261, as indicated by arrows in FIG. 20, since a flow path of the heating water flowing along the heating sensible heat portion heating water flow path P3 is guided by the guide portions 221 and 261 in a direction toward the combustion chamber C, a separation distance between the burner 100 installed inside the combustion chamber C and the heating water is shortened so that combustion heat of the burner 100 can be effectively transferred to the heating water and generation of turbulence is promoted in the flow of the heating water such that heat transfer efficiency can be improved.

Referring to FIG. 15, a plurality of first gap maintaining portions 222 protruding toward the heating sensible heat portion combustion gas flow path P4 are formed at the first protrusion 220, and a plurality of second gap maintaining portions 262 are formed at the first recess 260 at positions corresponding to the plurality of first gap maintaining portions 222 to protrude toward the heating sensible heat portion combustion gas flow path P4. A protruding end of the first gap maintaining portion 222 and a protruding end of the second gap maintaining portion 262 are formed to be in contact with each other.

With such configurations of the first gap maintaining portion 222 and the second gap maintaining portion 262, a gap between the heating sensible heat portion combustion gas flow paths P4 may be constantly maintained, and the coupling strength between the first plate and the second plate may be enhanced in association with the configurations of the first flanges H3-1 and H4-1 and the second flanges H7-1 and H8-1, which are described above.

Meanwhile, in order to form a local laminar flow in the combustion gas flowing through the heating sensible heat portion combustion gas flow path P4 to improve heat exchange efficiency between the combustion gas and the heating medium, a gap, which is a vertically spaced distance, between the heating sensible heat portion combustion gas flow paths P4 is preferably set to be in a range of 0.8 to 1.6 mm.

Further, as shown in FIGS. 14, 15, and 18, one of the ends of the first plate and the second plate, which are disposed at the circumference of the combustion chamber C, is bent, seamed, and weld-coupled to be in close contact with the other of the ends thereof. In this case, a length of a seamed end S of the first plate and the second plate is preferably set to be in a range of 1 to 5 mm to prevent overheating of the seamed end S and maintain welding quality.

Meanwhile, referring to FIG. 20, a width E1 of a side area facing the heating latent heat portion 200B is preferably formed to be greater than a width E2 of a side area opposite the heating latent heat portion 200B among areas of the plate constituting the heating sensible heat portion 200A. This is because most of the combustion gas generated in the combustion chamber C flows toward the heating latent heat portion 200B and thus the width E1 of the side area facing the heating latent heat portion 200B is formed to be greater than the width E2 of the side area opposite the heating latent heat portion 200B to secure a wider heat transfer area in a region in which a heat exchange is actively performed.

Flow paths of the combustion gas, the heating water, and the hot water in the heat exchanger 1 according to the present invention will be described below.

The flow path of the combustion gas will be described first with reference to FIG. 17. In FIG. 17, arrows indicate a flow direction of the combustion gas.

The combustion gas generated by the combustion in the burner 100 flows radially outward inside the combustion chamber C and passes through the heating sensible heat portion combustion gas flow path P4 formed between the unit plates of the heating sensible heat portion 200A, and sensible heat of the combustion gas is transferred to the heating water passing through the heating sensible heat portion heating water flow path P3 while the combustion gas passes through the heating sensible heat portion combustion gas flow path P4.

A combustion gas flowing downward via the heating sensible heat portion combustion gas flow path P4 flows downward through the heating latent heat portion combustion gas flow path P2 formed between the unit plates of the heating latent heat portion 200B and the hot water latent heat portion combustion gas flow path P6 formed between the unit plates of the hot water latent heat portion 200C, and latent heat of condensation contained in water vapor of the combustion gas is transferred to the heating water passing through the heating latent heat portion heating water flow path P1 and to the hot water latent heat portion hot water flow path P5 to preheat the heating water and the direct water (the hot water) while the combustion gas flows downward through the heating latent heat portion combustion gas flow path P2 and the hot water latent heat portion combustion gas flow path P6.

A combustion gas reaching a lower portion of the hot water latent heat portion combustion gas flow path P6 passes through the plurality of combustion gas pass-through portions D which are formed at the lower portion of the hot water latent heat portion 200C at regular intervals, and is discharged downward. At this point, since the combustion gas is distributed and discharged at a uniform flow rate across the entire lower area of the hot water latent heat portion 200C due to the plurality of combustion gas pass-through portions D formed at regular intervals, a phenomenon in which the combustion gas is biased to one side is prevented such that the flow resistance of the combustion gas can be reduced, and generation of noise and vibration can be also minimized.

The combustion gas passing through the plurality of combustion gas pass-through portions D is discharged upward through the lower cover 310 and the combustion gas discharge pipe 320, and condensation is discharged through the condensation discharge pipe 311 connected to the lower portion of the lower cover 310.

The flow paths of the heating water and the hot water will be described below with reference to FIGS. 5 and 7. In FIGS. 5 and 7, solid arrows indicate a flow direction of the heating water, and dotted arrows indicate a flow direction of the direct water (the hot water).

The flow path of the heating water in the heating latent heat portion 200B will be described first.

Heating water flowing into the heating water inlet 201 formed at the first plate 200a-1, which is disposed at a front surface of the plurality of plates, sequentially passes through the first through-hole H1 and the fifth through-hole H5 formed at each of the plurality of plates 200b-1 to 200a-12, which are stacked behind the first plate 200a-1, to flow toward the water housing cooling portion B provided between the first plate 200a-12 and the second plate 200b-12 of the unit plate 200-12 disposed at the rearmost position. Further, some flow amount of the heating water sequentially passing through the first through-hole H1 and the fifth through-hole H5 passes through the heating latent heat portion heating water flow paths P1 provided inside each of the unit plates 200-1 to 200-11 in a parallel structure, sequentially passes through the second through-hole H2 and the sixth through-hole H6 which are diagonally disposed with respect to the first through-hole H1 and the fifth through-hole H5, respectively, and flows toward the water housing cooling portion B provided between the first plate 200a-12 and the second plate 200b-12.

As described above, since the heating water flow paths of the heating latent heat portion 200B are provided in a multiple parallel structure, flow resistance of the heating water passing through the heating latent heat portion heating water flow path P1 is reduced, and, since the heating latent heat portion heating water flow path P1 and the heating latent heat portion combustion gas flow path P2 are alternately disposed to be adjacent to each other, the heating water passing through the heating latent heat portion heating water flow path P1 may be preheated by effectively absorbing the latent heat of the water vapor contained in the combustion gas.

Next, the flow path of the heating water in the heating sensible heat portion 200A will be described.

The heating water passing through the water housing cooling portion B absorbs heat transferred to the rear side of the combustion chamber C, and then sequentially passes through a third through-hole H3 formed at the first plate 200a-12 of the twelfth unit plate 200-12 and third through-holes H3 and seventh through-holes H7 formed at the plates 200b-11 to 200b-9 sequentially stacked in front of the twelfth unit plate 200-12.

Further, since the first blocked portions H3' and H7' are formed at the plates 200a-9 and 200b-8 stacked at the front side, some of the heating water sequentially passing through the third through-holes H3 and the seventh through-holes H7 and flowing into the heating sensible heat portion heating water flow path P3 formed at each of the unit plates 200-12 to 200-9 branches off in both directions, flows in the directions toward the fourth through-hole H4 and the eighth through-hole H8 which are each disposed to be diagonal to the third through-hole H3 and the seventh through-hole H7, and then sequentially passes through the fourth through-hole H4 and the eighth through-hole H8 to flow to the front side.

The heating water passing through the fourth through-hole H4 and the eighth through-hole H8 of the plates 200a-9 and 200b-8 sequentially passes through a fourth through-hole H4 and an eighth through-hole H8 which are formed at each of the plates 200a-8 to 200b-5 sequentially stacked in front of the plates 200a-9 and 200b-8.

Further, since the second blocked portions H4' and H8' are formed at the plates 200a-5 and 200b-4 stacked at the front side, some of the heating water sequentially passing through the fourth through-holes H4 and the eighth through-holes H8 and flowing into the heating sensible heat portion heating water flow path P3 formed at each of the unit plates 200-8 to 200-5 branches off in both directions, flows in the directions toward the third through-hole H3 and the seventh through-hole H7 which are each disposed to be diagonal to the fourth through-hole H4 and the eighth through-hole H8, and then sequentially passes through the third through-hole H3 and the seventh through-hole H7 to flow to the front side.

The heating water passing through the third through-hole H3 and the seventh through-hole H7 of the plates 200a-5 and 200b-4 sequentially passes through a third through-hole H3 and a seventh through-hole H7 which are formed at each of the plates 200a-4 to 200b-1 sequentially stacked in front of the plates 200a-5 and 200b-4.

Further, since portions of the plate 200a-1 disposed at the foremost position and corresponding to the third through-hole H3 and the seventh through-hole H7 are blocked, some of the heating water sequentially passing through the third through-holes H3 and the seventh through-holes H7 and flowing into the heating sensible heat portion heating water flow path P3 formed at each of the unit plates 200-4 to 200-1 branches off in both directions, flows in the directions toward the fourth through-hole H4 and the eighth through-hole H8 which are each disposed to be diagonal to the third through-hole H3 and the seventh through-hole H7, and then sequentially passes through the fourth through-hole H4 and the eighth through-hole H8 to be discharged through the heating water outlet 202 formed at the plate 200a-1 disposed at the foremost position.

Next, the flow path of the direct water (the hot water) in the hot water latent heat portion 200C will be described.

Direct water flowing into the direct water inlet 203 formed at the first plate 200a-1 located on a front surface of the plurality of plates sequentially passes through the ninth through-holes H9a and H9b formed at the plurality of plates 200b-1 to 200a-12 stacked behind the first plate 200a-1 to flow toward the plate 200b-12 located at the rearmost position in a rearward direction, and some flow amount of the direct water passing sequentially through the ninth through-holes H9a and H9b passes through the hot water latent heat portion hot water flow path P5 provided inside each of the unit plates 200-1 to 200-11 in a parallel structure, sequentially passes through the tenth through-holes H10a and H10b disposed to be diagonal to the ninth through-holes H9a and H9b, and is discharged through the hot water outlet 204 formed at the first plate 200a-1 disposed at the foremost position.

As described above, the hot water flow paths P5 of the hot water latent heat portion 200C is provided in a multiple parallel structure and are alternately disposed to be adjacent to the hot water latent heat portion combustion gas flow paths P6 such that the direct water (the hot water) passing through the hot water latent heat portion hot water flow path P5 can be preheated by effectively absorbing latent heat of water vapor contained in the combustion gas. Further, as described above, the hot water discharged through the hot water outlet 204 is supplied to the hot water heat exchanger 50, undergoes the secondary heat exchange with the heating water and is heated, and then is supplied to the user as the hot water having a temperature desired by the user through the hot water supply pipe 17.

FIG. 7 illustrates the above-described flow paths of the heating water in the heating latent heat portion 200B and the heating sensible heat portion 200A and the above-described flow path of the hot water in the hot water latent heat portion 200C as a unit of a plate group, and in the present embodiment, an example in which a first plate group 200-A, a second plate group 200-B, and a third plate group 200-C, which are each configured with a set of eight plates, are configured from the front side to the rear side, has been described, but the total number of stacked plates and the number of plates constituting each of the plate groups in the present invention may be changed and implemented.

As described above, since the flow paths of the heating water in the heating sensible heat portion 200A are configured to be connected in series, the flow path of the heating water may be formed to be maximally long within a limited space of the heating sensible heat portion 200A such that heat exchange efficiency between the heating water and the combustion gas can be significantly improved.

The invention claimed is:

1. A heat exchanger comprising:
a heat exchange portion (200) in which a heating water flow path through which heating water flows, a hot water flow path through which hot water flows, and a combustion gas flow path through which a combustion gas combusted in a burner (100) flows are alternately formed to be adjacent to each other in a space between a plurality of plates,
wherein the heat exchange portion (200) is configured with a heating sensible heat portion (200A) configured to surround an outer side of a combustion chamber (C), configured with an area at one side of a plate, and configured to heat the heating water using sensible heat of the combustion gas generated by the combustion in the burner (100); a heating latent heat portion (200B) configured with a partial area at the other side of the plate and configured to heat the heating water using latent heat of water vapor contained in the combustion gas which underwent heat exchange in the heating sensible heat portion (200A); and a hot water latent heat portion (200C) configured with the remaining area of the other side of the plate and configured to heat direct water using latent heat of water vapor contained in the combustion gas passing through the heating latent heat portion (200B).

2. The heat exchanger of claim 1, wherein:
a connection passage for the heating water is formed between the heating sensible heat portion (200A) and the heating latent heat portion (200B),
the plurality of plates have an upright structure such that the heating sensible heat portion (200A) is disposed at a top part of the upright structure, and the heating latent heat portion (200B) and the hot water latent heat portion (200C) are disposed at a bottom part of the upright structure, and
the burner (100) is a cylindrical burner and is inserted into a space of the combustion chamber (C) in a horizontal direction from a front surface thereof to be assembled.

3. The heat exchanger of claim 1, wherein the plate constituting the heating sensible heat portion (200A) is configured such that a width of a side area of the plate facing the heating latent heat portion (200A) is formed to be greater than that of an area of the plate opposite the heating latent heat portion (200A).

4. The heat exchanger of claim 1, wherein:
a connection passage for the heating water is formed between the heating sensible heat portion (200A) and the heating latent heat portion (200B),
the heating latent heat portion (200B) includes a heating water inlet (201) into which the heating water flows, and a plurality of heating latent heat portion heating water flow paths (P1) formed between the plurality of plates and communicating with the heating water inlet (201) in parallel thereto, and
the heating sensible heat portion (200A) includes a heating water outlet (202) through which the heating water is discharged, and a plurality of heating sensible heat portion heating water flow paths (P3) formed between the plurality of plates and connected in series between the heating latent heat portion heating water flow path (P1) and the heating water outlet (202).

5. The heat exchanger of claim 4, wherein the hot water latent heat portion (200C) includes a direct water inlet (203) into which direct water flows; a hot water outlet (204) formed in a diagonal direction to the direct water inlet (203) and through which the heating water is discharged; and a plurality of hot water latent heat portion hot water flow paths (P5) provided between the plurality of plates and communicating with the direct water inlet (203) and the hot water outlet (204) in parallel thereto.

6. The heat exchanger of claim 4, wherein:
a heating sensible heat portion combustion gas flow path (P4) is provided between the heating sensible heat portion heating water flow paths (P3),
a heating latent heat portion combustion gas flow path (P2) communicating with the heating sensible heat portion combustion gas flow path (P4) is provided between the heating latent heat portion heating water flow paths (P1), and
a hot water latent heat portion combustion gas flow path (P6) communicating with the heating latent heat portion combustion gas flow path (P2) is provided between the hot water latent heat portion hot water flow paths (P5).

7. The heat exchanger of claim 4, wherein:
through-holes (H1) and (H5) provided at one side of the heating latent heat portion (200B) and through-holes (H2) and (H6) provided at the other side thereof, which communicate with the heating latent heat portion heating water flow paths (P1), are diagonally formed at the heating latent heat portion (200B) to connect the heating latent heat portion heating water flow paths (P1) in parallel, and
through-holes (H3) and (H7) provided at one side of the heating sensible heat portion (200A) and through-holes (H4) and (H8) provided at the other side thereof, which communicate with the heating sensible heat portion heating water flow paths (P3), are diagonally formed at the heating sensible heat portion (200A) to connect the heating sensible heat portion heating water flow paths (P3) in series.

8. The heat exchanger of claim 7, wherein:
heating water flowing into the heating sensible heat portion heating water flow path (P3) through the through-holes (H3) and (H7) provided at the one side branches off in both directions and flows toward the through-holes (H4) and (H8) formed at the other side in a diagonal direction, and
heating water flowing into the heating sensible heat portion heating water flow path (P3) through the through-holes (H4) and (H8) branches off in both directions and flows toward the through-holes (H3) and (H7) formed at the one side in the diagonal direction.

9. The heat exchanger of claim 8, wherein first blocked portions (H3') and (H7') configured to guide a heating medium, which flows into the heating sensible heat portion heating water flow path (P3) through the through-holes (H3) and (H7) provided at the one side, to flow toward the through-holes (H4) and (H8) formed at the other side in the diagonal direction, and second blocked portions (H4') and (H8') configured to guide a heating medium, which flows into the heating sensible heat portion heating water flow path (P3) through the through-holes (H4) and (H8) provided at the other side, to flow toward the through-holes (H3) and (H7) formed at the one side in the diagonal direction are formed at the heating sensible heat portion (200A).

10. The heat exchanger of claim 7, wherein:
first flanges (H3-1) and (H4-1) are respectively formed at the through-holes (H3) and (H4) to protrude toward the combustion gas flow path, and
second flanges (H7-1) and (H8-1) are respectively formed at the through-holes (H7) and (H8) to protrude toward the combustion gas flow path and in contact with ends of the first flanges (H3-1) and (H4-1).

11. The heat exchanger of claim 1, wherein guide portions (221) and (261) configured to guide the heating water to flow toward a center of the combustion chamber (C) are formed at a heating water flow path of the heating sensible heat portion (200A).

12. The heat exchanger of claim 1, wherein:
a flange is formed to be bent at an edge of each of the plurality of plates, and
a combustion gas pass-through portion (D) through which the combustion gas flowing in the combustion gas flow path passes is formed at some area of edges of the plurality of plates in a state in which flanges of adjacent plates overlap with each other.

13. The heat exchanger of claim 1, wherein a water housing cooling portion (B) configured to provide a connection passage for the heating water to direct the heating water which passes through a heating water flow path of the heating latent heat portion (200B) to flow into a heating water flow path of the heating sensible heat portion (200A) and insulate the combustion chamber (C) is formed behind the heating sensible heat portion (200A).

14. The heat exchanger of claim 1, wherein:
the plurality of plates are formed by stacking a plurality of unit plates in each of which a first plate and a second plate are stacked,
a heating water flow path and a hot water flow path are formed between the first plate and the second plate of the unit plate, and
a combustion gas flow path is formed between a second plate constituting a unit plate disposed at one side of adjacently stacked unit plates and a first plate of a unit plate disposed at the other side thereof.

15. The heat exchanger of claim 14, wherein the first plate is configured with a first plane portion (210); a first protrusion (220) protruding from one side of the first plane portion (210) to a front side and having a first opening (A1) formed at a center of the first protrusion (220) to constitute the heating sensible heat portion (200A); a second protrusion (230a) protruding from the other side of the first plane portion (210) to the front side and configured to form the heating latent heat portion (200B); and a third protrusion (230b) protruding from the other side of the second protrusion (230a) to the front side and configured to form the hot water latent heat portion (200C), and
the second plate is configured with a second plane portion (250), a first recess (260) recessed from one side of the second plane portion (250) to a rear side, configured to form a heating sensible heat portion heating water flow path (P3) between the first protrusion (220) and the first recess (260), and having a second opening (A2) formed at a center of the first recess (260) and corresponding to the first opening (A1); a second recess (270a) recessed from the other side of the second plane portion (250) to the rear side and configured to form a heating latent heat portion heating water flow path (P1) between the second protrusion (230a) and the second recess (270a); and a third recess (270b) recessed from one side of the second recess (270a) and configured to form a hot water latent heat portion hot water flow path (P5) between the third protrusion (230b) and the third recess (270b).

16. The heat exchanger of claim 15, wherein, when the first plate and the second plate are stacked, the first plane portion (210) and the second plane portion (250) are in contact with each other, the second protrusion (230a) and the second recess (270a) are formed to be in comb shapes bent in opposite directions, and the third protrusion (230b) and the third recess (270b) are formed to be in comb shapes bent in opposite directions.

17. The heat exchanger of claim 15, wherein:
a plurality of first gap maintaining portions (222) are formed at the first protrusion (220) to protrude toward the combustion gas flow path, and
a plurality of second gap maintaining portions (262) are formed at the first recess (260) at positions corresponding to the plurality of first gap maintaining portions (222) to protrude toward the combustion gas flow path.

* * * * *